United States Patent [19]

Cage

[11] 4,454,595
[45] Jun. 12, 1984

[54] BUFFER FOR USE WITH A FIXED DISK CONTROLLER

[75] Inventor: Curtis Cage, Santa Clara, Calif.

[73] Assignee: Pitney Bowes Inc., Stamford, Conn.

[21] Appl. No.: 334,037

[22] Filed: Dec. 23, 1981

[51] Int. Cl.³ .............................................. G06F 3/00
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 4,144,583 | 3/1979 | Lawson et al. | 364/900 |
| 4,210,959 | 7/1980 | Wozniak | 364/200 |
| 4,371,929 | 2/1983 | Brann et al. | 364/200 |

*Primary Examiner*—Raulfe B. Zache

*Attorney, Agent, or Firm*—Robert H. Whisker; David E. Pitchenik; William D. Soltow, Jr.

[57] ABSTRACT

A buffer for use with a word processing fixed disk controller. The buffer is connected to a microprocessor and communications bus used for interfacing a floppy disk processor to a hard or fixed disk controlled. Also connected to the communications bus are a direct memory access (DMA) controller and random access memory. The buffer operates on a first-in/first-out (FIFO), or rotating shift register basis, although it is a stationary four-part buffer. Error checking and correcting can be performed on a disk processor level. A block of data is transferred to the disk via a DMA operation only when the block of data is complete, thus eliminating data early and data late conditions.

49 Claims, 42 Drawing Figures

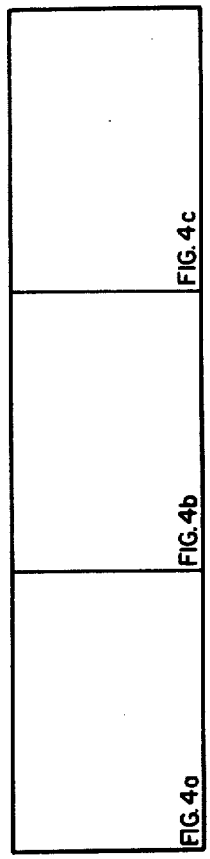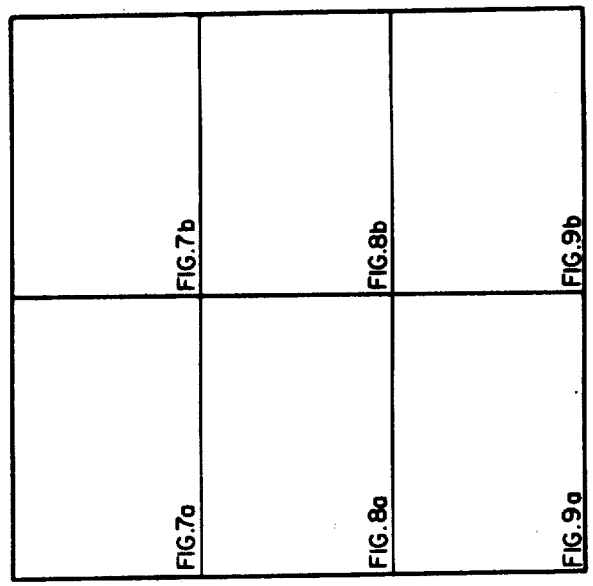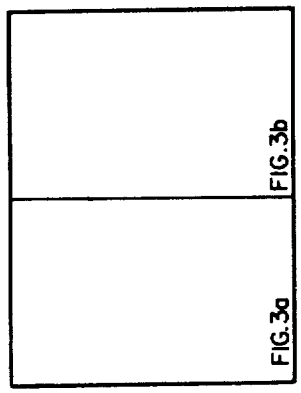

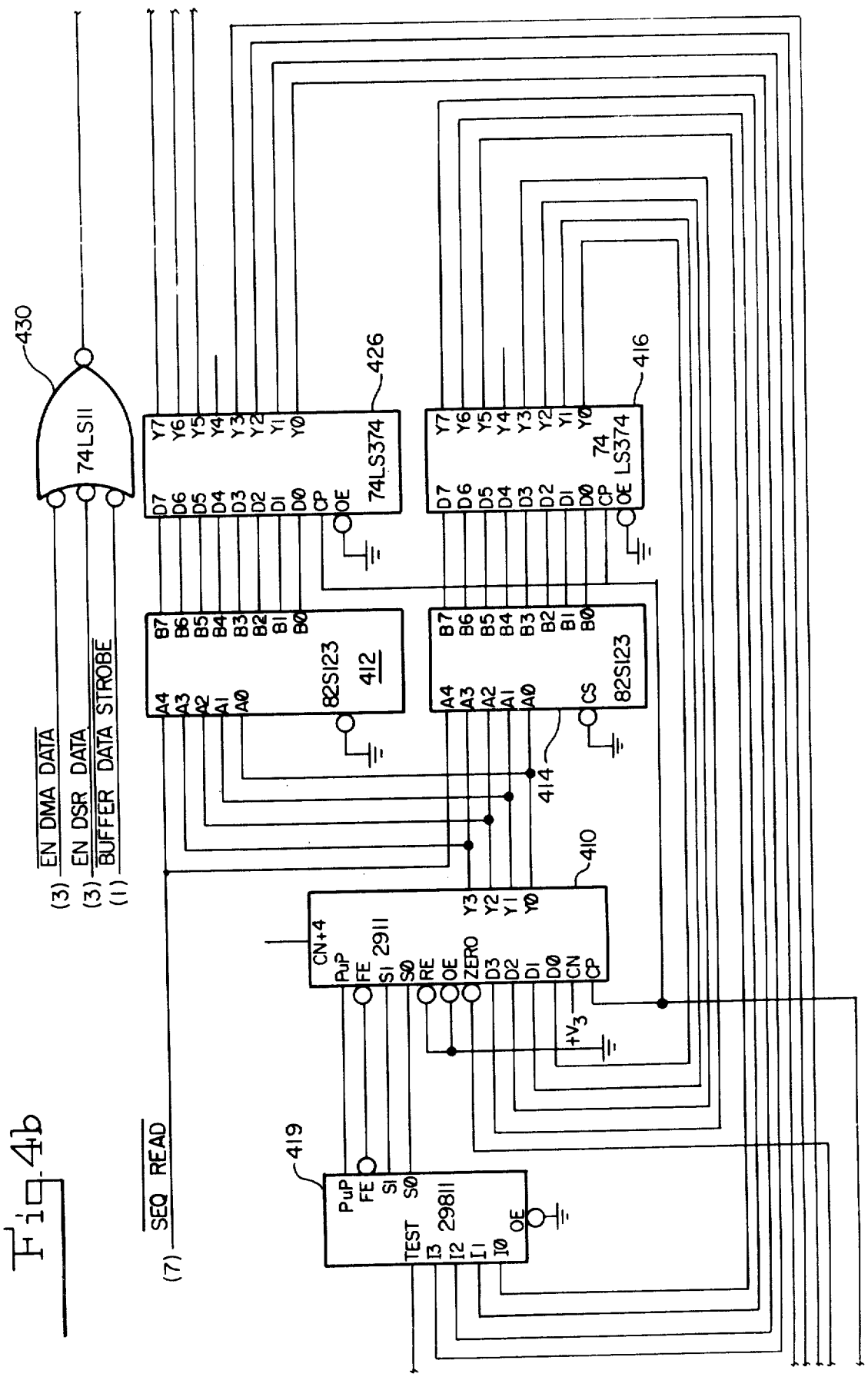

| ROM ADDRESS | SEQ COUNT | 1024 | 512 | 256 | 128 | 64 | 32 | 16 | 8 | 4 | 2 | 1 | BIT 4 | RD ID | RD ECC FLD | EN ECC CLK | WR AM |
|---|---|---|---|---|---|---|---|---|---|---|---|---|---|---|---|---|---|
| | | \multicolumn{11}{c}{BYTE COUNT} | | | | | |
| 00 | 2.0 | 0 | 0 | 0 | 0 | 0 | 0 | 0 | 0 | 0 | 1 | 0 | 0 | 0 | 0 | 0 | 0 |
| 01 | 3.4 | 0 | 0 | 0 | 0 | 0 | 0 | 0 | 0 | 0 | 1 | 1 | 1 | 1 | 0 | 1 | 0 |
| 02 | 6.4 | 0 | 0 | 0 | 0 | 0 | 0 | 0 | 0 | 1 | 1 | 0 | 1 | 1 | 0 | 1 | 0 |
| 03 | 9.4 | 0 | 0 | 0 | 0 | 0 | 0 | 0 | 1 | 0 | 0 | 1 | 1 | 0 | 0 | 1 | 0 |
| 04 | 10.4 | 0 | 0 | 0 | 0 | 0 | 0 | 0 | 1 | 0 | 1 | 0 | 1 | 0 | 0 | 1 | 0 |
| 05 | 11.4 | 0 | 0 | 0 | 0 | 0 | 0 | 0 | 1 | 0 | 1 | 1 | 1 | 0 | 0 | 1 | 0 |
| 06 | 13.0 | 0 | 0 | 0 | 0 | 0 | 0 | 0 | 1 | 1 | 0 | 1 | 0 | 0 | 0 | 1 | 0 |
| 07 | 13.4 | 0 | 0 | 0 | 0 | 0 | 0 | 0 | 1 | 1 | 0 | 1 | 1 | 0 | 0 | 1 | 0 |
| 08 | 269.4 | 0 | 0 | 1 | 0 | 0 | 0 | 0 | 1 | 1 | 0 | 1 | 1 | 0 | 0 | 1 | 0 |
| 09 | 272.4 | 0 | 0 | 1 | 0 | 0 | 0 | 1 | 0 | 0 | 0 | 0 | 1 | 0 | 0 | 1 | 0 |
| 0A | 273.4 | 0 | 0 | 1 | 0 | 0 | 0 | 1 | 0 | 0 | 0 | 1 | 0 | 0 | 1 | 0 | 0 |
| 0B | 274.0 | 0 | 0 | 1 | 0 | 0 | 0 | 1 | 0 | 0 | 0 | 1 | 1 | 0 | 0 | 0 | 0 |
| 0C | 275.0 | 0 | 0 | 1 | 0 | 0 | 0 | 1 | 0 | 0 | 1 | 1 | 0 | 0 | 0 | 0 | 0 |
| 0D | 276.0 | 0 | 0 | 1 | 0 | 0 | 0 | 1 | 0 | 1 | 0 | 0 | 0 | 0 | 0 | 0 | 0 |
| 0E | .0 | 0 | 0 | 0 | 0 | 0 | 0 | 0 | 0 | 0 | 0 | 0 | 0 | 0 | 0 | 0 | 0 |
| 0F | .0 | 0 | 0 | 0 | 0 | 0 | 0 | 0 | 0 | 0 | 0 | 0 | 0 | 0 | 0 | 0 | 0 |
| 10 | 2.0 | 0 | 0 | 0 | 0 | 0 | 0 | 0 | 0 | 0 | 1 | 0 | 0 | 0 | 0 | 0 | 0 |
| 11 | 3.4 | 0 | 0 | 0 | 0 | 0 | 0 | 0 | 0 | 0 | 1 | 1 | 1 | 1 | 0 | 1 | 0 |
| 12 | 6.4 | 0 | 0 | 0 | 0 | 0 | 0 | 0 | 0 | 1 | 1 | 0 | 1 | 1 | 0 | 1 | 0 |
| 13 | 9.4 | 0 | 0 | 0 | 0 | 0 | 0 | 0 | 1 | 0 | 0 | 1 | 1 | 0 | 0 | 1 | 0 |
| 14 | 10.4 | 0 | 0 | 0 | 0 | 0 | 0 | 0 | 1 | 0 | 1 | 0 | 1 | 0 | 0 | 1 | 0 |
| 15 | 11.0 | 0 | 0 | 0 | 0 | 0 | 0 | 0 | 1 | 0 | 1 | 1 | 0 | 0 | 0 | 1 | 1 |
| 16 | 12.0 | 0 | 0 | 0 | 0 | 0 | 0 | 0 | 1 | 1 | 0 | 0 | 0 | 0 | 0 | 1 | 1 |
| 17 | 24.0 | 0 | 0 | 0 | 0 | 0 | 0 | 1 | 1 | 0 | 0 | 0 | 0 | 0 | 0 | 1 | 0 |
| 18 | 43.4 | 0 | 0 | 0 | 0 | 0 | 1 | 0 | 1 | 0 | 1 | 1 | 1 | 0 | 0 | 1 | 0 |
| 19 | 280.4 | 0 | 0 | 1 | 0 | 0 | 0 | 1 | 1 | 0 | 0 | 0 | 1 | 0 | 0 | 1 | 0 |
| 1A | 281.4 | 0 | 0 | 1 | 0 | 0 | 0 | 1 | 1 | 1 | 0 | 1 | 1 | 0 | 0 | 1 | 0 |
| 1B | 285.4 | 0 | 0 | 1 | 0 | 0 | 0 | 1 | 1 | 1 | 0 | 1 | 1 | 0 | 0 | 1 | 0 |
| 1C | 287.4 | 0 | 0 | 1 | 0 | 0 | 0 | 1 | 1 | 1 | 1 | 1 | 0 | 0 | 0 | 1 | 0 |
| 1D | 288.4 | 0 | 0 | 1 | 0 | 0 | 1 | 0 | 0 | 0 | 0 | 0 | 0 | 0 | 0 | 1 | 0 |
| 1E | 299.0 | 0 | 0 | 1 | 0 | 0 | 1 | 0 | 0 | 0 | 0 | 1 | 0 | 0 | 0 | 0 | 0 |
| 1F | 0 | 0 | 0 | 0 | 0 | 0 | 0 | 0 | 0 | 0 | 0 | 0 | 0 | 0 | 0 | 0 | 0 |

SEQUENCE ROM (MS) Ref.# 644 – FIG. 6     SEQUENCE ROM (LS) Ref.# 646 – FIG. 6

| RD DATA FLD | EOFS | ID END | WR ECC FLD | WR DATA FLD | WR GATE | ID ECC | RD GATE | RD DATA FLD | EOFS | ID END | WR ECC FLD | WR DATA FLD | WR GATE | IDECC | RG GATE | SEQ ROM (MS) | SEQ ROM (LS) | READ ROM | WRITE ROM |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 00 | 40 | 00 | 00 |
| 0 | 0 | 0 | 0 | 0 | 0 | 0 | 1 | 0 | 0 | 0 | 0 | 0 | 0 | 0 | 1 | 00 | 7A | 01 | 01 |
| 0 | 0 | 0 | 0 | 0 | 0 | 0 | 1 | 0 | 0 | 0 | 0 | 0 | 0 | 0 | 1 | 00 | DA | 01 | 01 |
| 0 | 0 | 0 | 0 | 0 | 0 | 0 | 1 | 0 | 0 | 0 | 0 | 0 | 0 | 0 | 1 | 01 | 32 | 01 | 01 |
| 0 | 0 | 0 | 0 | 0 | 0 | 1 | 1 | 0 | 0 | 0 | 0 | 0 | 0 | 1 | 1 | 01 | 52 | 03 | 03 |
| 0 | 0 | 0 | 0 | 0 | 0 | 0 | 1 | 0 | 0 | 0 | 0 | 0 | 0 | 0 | 0 | 01 | 72 | 01 | 00 |
| 0 | 0 | 1 | 0 | 0 | 0 | 0 | 0 | 0 | 0 | 0 | 0 | 0 | 0 | 0 | 0 | 01 | A2 | 01 | 00 |
| 0 | 0 | 0 | 0 | 0 | 0 | 0 | 1 | 0 | 0 | 0 | 0 | 0 | 1 | 0 | 0 | 01 | B2 | 81 | 04 |
| 1 | 0 | 0 | 0 | 0 | 0 | 0 | 1 | 0 | 0 | 0 | 0 | 1 | 1 | 0 | 0 | 21 | 82 | 81 | 0C |
| 0 | 0 | 0 | 0 | 0 | 0 | 0 | 1 | 0 | 0 | 0 | 0 | 1 | 1 | 0 | 0 | 22 | 12 | 01 | 0C |
| 0 | 0 | 0 | 0 | 0 | 0 | 0 | 1 | 0 | 0 | 0 | 1 | 1 | 1 | 0 | 0 | 22 | 24 | 01 | 1C |
| 0 | 0 | 0 | 0 | 0 | 0 | 0 | 0 | 0 | 0 | 0 | 1 | 0 | 1 | 0 | 0 | 22 | 30 | 00 | 14 |
| 0 | 0 | 0 | 0 | 0 | 0 | 0 | 0 | 0 | 0 | 0 | 0 | 0 | 1 | 0 | 0 | 22 | 60 | 00 | 04 |
| 0 | 1 | 0 | 0 | 0 | 0 | 0 | 0 | 0 | 0 | 0 | 0 | 0 | 0 | 0 | 0 | 22 | 80 | 40 | 00 |
| 0 | 0 | 0 | 0 | 0 | 0 | 0 | 0 | 0 | 1 | 0 | 0 | 0 | 0 | 0 | 0 | 00 | 00 | 40 | 04 |
| 0 | 0 | 0 | 0 | 0 | 0 | 0 | 0 | 0 | 0 | 0 | 0 | 0 | 0 | 0 | 0 | 00 | 00 | 00 | 00 |
| 0 | 0 | 0 | 0 | 0 | 0 | 0 | 0 | 0 | 0 | 0 | 0 | 0 | 1 | 0 | 0 | 00 | 40 | 00 | 04 |
| 0 | 0 | 0 | 0 | 0 | 0 | 0 | 1 | 0 | 0 | 0 | 0 | 1 | 0 | 0 | 0 | 00 | 7A | 01 | 04 |
| 0 | 0 | 0 | 0 | 0 | 0 | 0 | 1 | 0 | 0 | 0 | 0 | 1 | 0 | 0 | 0 | 00 | DA | 01 | 04 |
| 0 | 0 | 0 | 0 | 0 | 0 | 0 | 1 | 0 | 0 | 0 | 0 | 0 | 1 | 0 | 0 | 01 | 32 | 01 | 04 |
| 0 | 0 | 0 | 0 | 0 | 0 | 1 | 1 | 0 | 0 | 0 | 0 | 0 | 1 | 0 | 0 | 01 | 52 | 03 | 04 |
| 0 | 0 | 0 | 0 | 0 | 0 | 0 | 0 | 0 | 0 | 0 | 0 | 0 | 1 | 0 | 0 | 01 | 63 | 00 | 04 |
| 0 | 0 | 0 | 0 | 0 | 0 | 0 | 0 | 0 | 0 | 0 | 0 | 0 | 1 | 0 | 0 | 01 | 83 | 00 | 04 |
| 0 | 0 | 0 | 0 | 0 | 1 | 0 | 0 | 0 | 0 | 0 | 0 | 0 | 1 | 0 | 0 | 03 | 02 | 04 | 04 |
| 0 | 0 | 0 | 0 | 1 | 1 | 0 | 0 | 0 | 0 | 0 | 0 | 0 | 1 | 0 | 0 | 05 | 72 | 0C | 0C |
| 0 | 0 | 0 | 0 | 1 | 1 | 0 | 0 | 0 | 0 | 0 | 0 | 0 | 0 | 0 | 0 | 22 | 12 | 0C | 00 |
| 0 | 0 | 0 | 0 | 1 | 1 | 0 | 0 | 0 | 0 | 0 | 0 | 0 | 0 | 0 | 0 | 23 | 72 | 0C | 00 |
| 0 | 0 | 0 | 0 | 1 | 1 | 0 | 0 | 0 | 0 | 0 | 0 | 0 | 0 | 0 | 0 | 23 | B2 | 0C | 00 |
| 0 | 0 | 0 | 0 | 0 | 1 | 0 | 0 | 0 | 0 | 0 | 0 | 0 | 0 | 0 | 0 | 23 | E2 | 04 | 00 |
| 0 | 0 | 0 | 0 | 0 | 1 | 0 | 0 | 0 | 0 | 0 | 0 | 0 | 0 | 0 | 0 | 24 | 02 | 04 | 00 |
| 0 | 1 | 0 | 0 | 0 | 0 | 0 | 0 | 0 | 1 | 0 | 0 | 0 | 0 | 0 | 0 | 24 | 20 | 40 | 40 |
| 0 | 0 | 0 | 0 | 0 | 0 | 0 | 0 | 0 | 0 | 0 | 0 | 0 | 0 | 0 | 0 | 00 | 00 | 00 | 00 |

READ ROM Ref.# 660-FIG. 6    WRITE ROM Ref.# 662-FIG. 6

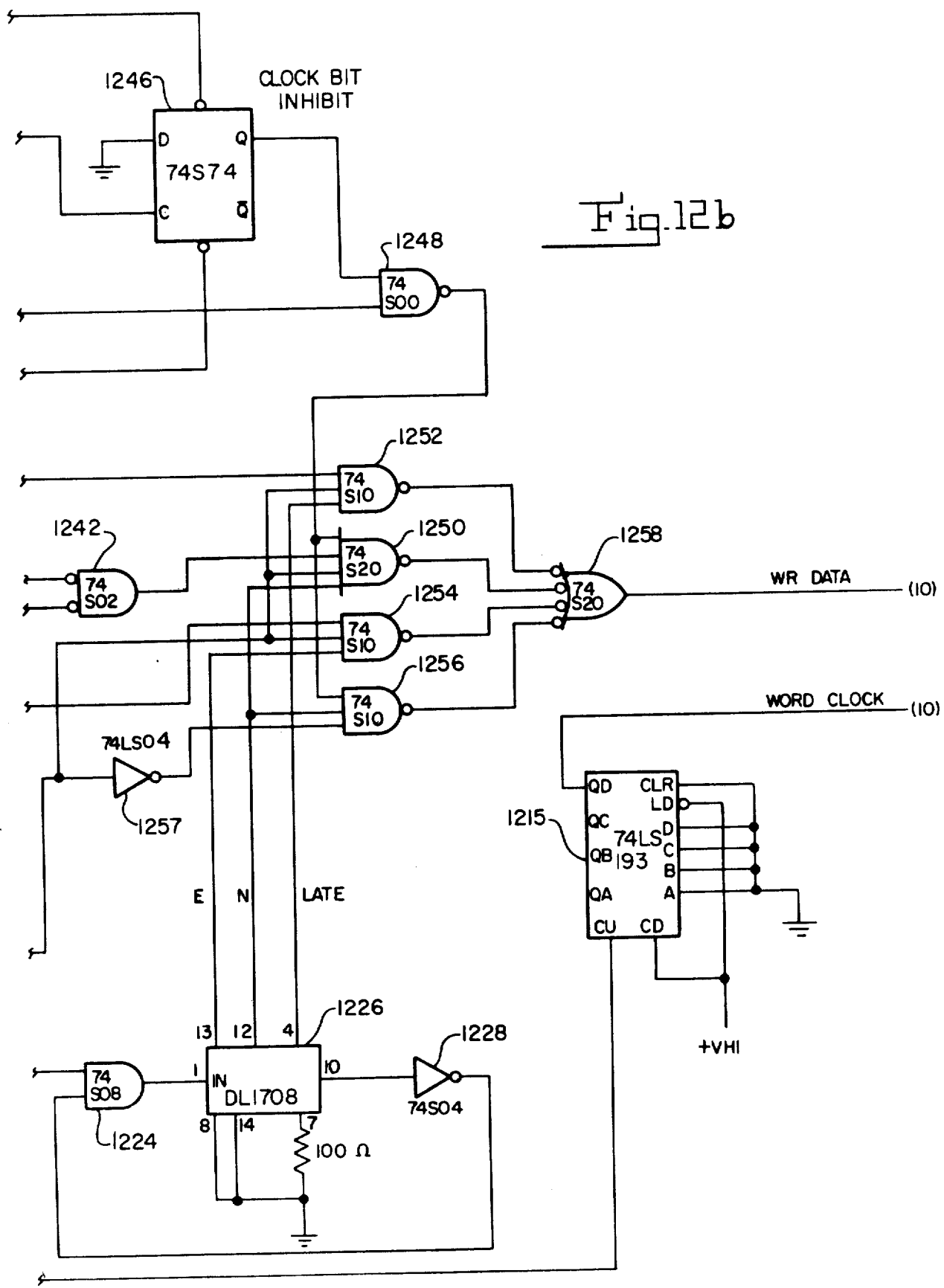

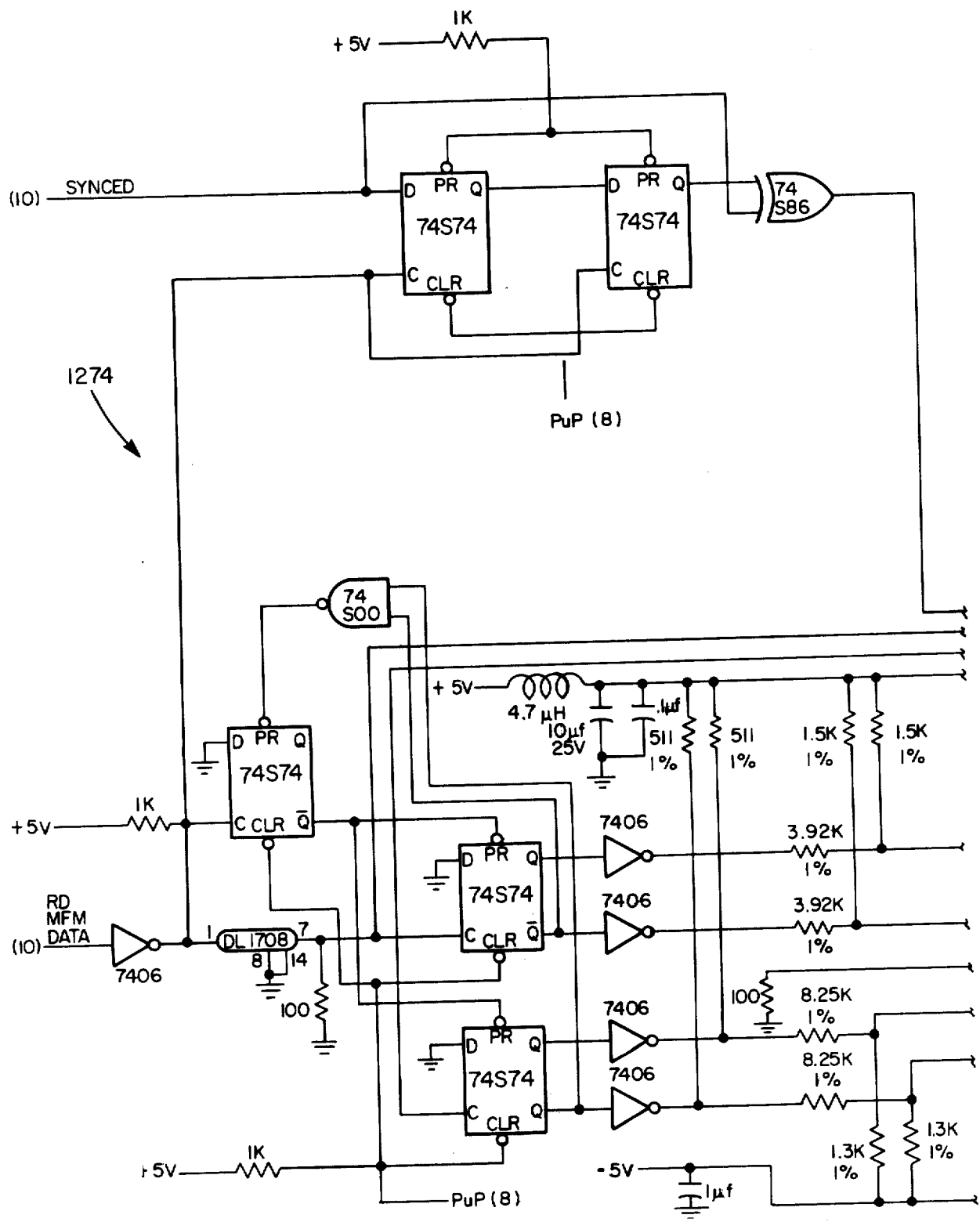

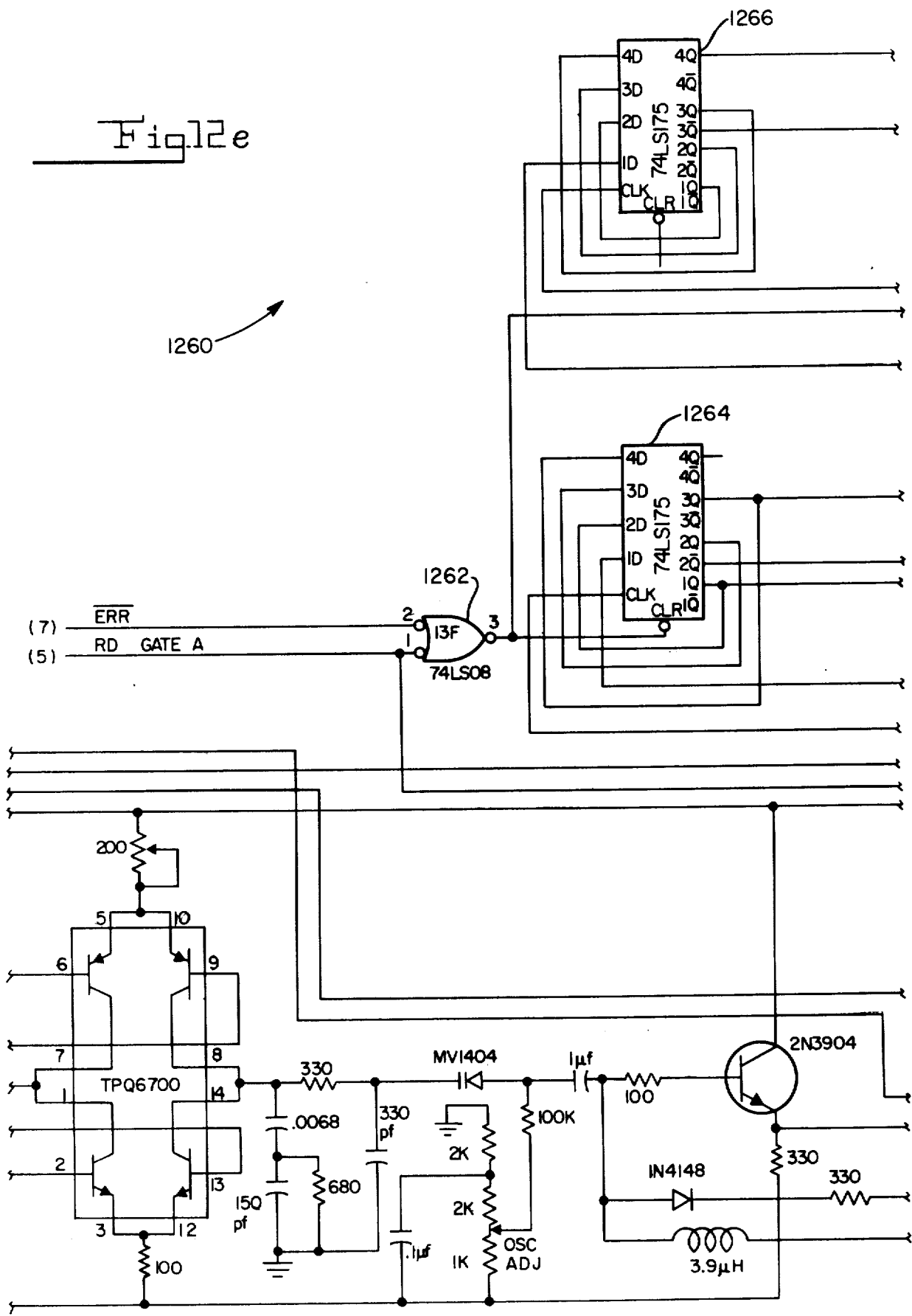

BUFFER FOR USE WITH A FIXED DISK CONTROLLER

BACKGROUND OF THE INVENTION

1. Field of the Invention

The present invention relates to a data buffer for use with a fixed disk drive and more particularly to a data buffer for use with a fixed disk drive controller in a word processing system.

2. Description of the Prior Art

It is desirable in word processing equipment to have a fixed disk drive to store data and programs.

Many word processing systems currently available consist of a keyboard, a printer, a display and a floppy disk drive, all controlled by one or more microprocessors. Floppy disk drives have been shown to be cost effective means by which programs and data can be stored and accessed on demand by the operator. Compared to other forms of data storage, such as magnetic tape cassettes, magnetic cards and punched paper tape, floppy disks allow the user to access more information and to access the information faster.

It has been found, however, that for larger systems requiring more data manipulation and formatting, the floppy disk system is inadequate. Resource sharing and time sharing data or word processing systems, for example, generally require a larger data base and shorter access time than do stand alone systems. Moreover, sophisticated operations such as merging of files, sorting of data within files, and dictionary capabilities often require more memory space and shorter cycle times to be performed efficiently in real time. Finally, for complex data handling procedures, increased reliability is also required.

The relative advantages of floppy disks over magnetic tape, cards and paper tape unfortunately dissolve in the aforementioned environments. The solution to the problems inherent in floppy disk systems can be found by using one or more hard or fixed disks in conjunction with or in lieu of floppy disks.

As word processing systems become more sophisticated, the storage capacity of their mass memory mediums must increase and the speed at which data is stored and retrieved must decrease. For these reasons, one or more flexible (floppy) disks may not be adequate to access a great amount of data in a relatively short time, even if the floppy disks are dual-sided, double density.

A rigid or fixed disk, on the other hand, has a larger storage capacity and the disk drive associated with it is generally capable of rotating it at a greater velocity. It is therefore advantageous to adapt such a rigid disk for use with a word processing system. A rigid disk, and in particular a Winchester disk, is coated on both sides with a magnetic medium, so that two surfaces per disk are available for the storage of data. Each Winchester read/write head has three rails, or raised surfaces. The trailing end of the middle rail holds a magnetic core with wire coiled around for writing and reading the data. The two outer rails govern the flow of air. The force that results is sufficient to support a weight of 10 grams at a height of half a micrometer above the disk. The disks and the head assemblies in such a memory are sealed in a small chamber in which the air is continuously recirculated an filtered to exclude any dust particles larger than 0.3 micrometer in diameter.

The quantity of data that can be stored on a disk depends on how much of its surface area is magnetized for the storage of a bit. The width of the center rail of a Winchester head is approximately 20 micrometers, which corresponds to a track density on the disk of about 1,000 per inch of the radius. On a floppy disk however, the track density is only 48 tracks per inch for single density disks (96 tracks per inch for double density disks).

In high-performance memories one of the surfaces of a disk is devoted to patterns of bits that continuously yield information on the position of the head. Any deviation from the proper position causes the generation of a signal in the head that actuates a motor for repositioning. Such patterns of bits may be embedded within the stored data itself.

The number of bits that can be written along a track also is affected by limitations on both the head and the disk. As a result of all these constraints the number of reversals in magnetism along a data track in a device that records digital data by magnetic saturation and employs a Winchester head is about 10,000 per inch. The quantity of data stored ranges from about 20 million bits for one surface of a floppy disk to billions of bits for high-performance rigid disks.

The rate at which bits are written or read along a track is called the data rate. It ranges from hundreds of thousands of bits per second for floppy disk systems to 10 million bits per second for rigid disk systems. The main reason for the difference is the fact that floppy disks must rotate at lower speeds.

In order to use the speed and storage capacity of a a fixed disk drive most efficiently, it is necessary to prepare data for transfer to it. Data for transfer to the disk drive must be ready when the disk is in position to accept it. Consequently, it would advantageous to incorporate a data buffer to accept data from other parts of the word processing system and hold it temporarily until the precise instant when the data must be transferred. A simple storage register used as a data buffer is not sufficient due to the fact that at the moment the disk accepts data therefrom no new data is ready for transfer to the disk. The disk is therefore forced to wait for subsequent data to be transferred to it. Such is the disadvantage of systems using true first-in/first-out (FIFO) registers. It would be most advantageous to incorporate a data buffer which has provision, when necessary, for allowing data to be input while simultaneously allowing data to be output to the disk.

In U.S. Pat. No. 4,145,739 issued to Dunning, et al., a master/slave magnetic disk system is disclosed. A 256-byte RAM buffer is used as a FIFO register and is connected to a master disk controller and memory to buffer data to or from the disk controller or memory. Only one block of data is transferred at a time. Consequently successive blocks of data cannot be read from adjacent sectors during a single disk revolution.

SUMMARY OF THE INVENTION

The present invention permits a fixed disk drive to be incorporated in a word processing system.

A system has been invented for allowing one or more fixed disk drives to be used in a word or data processing system in addition to or in lieu of one or more floppy disk drives. The fixed disk drive provides greater flexibility in a word processing system by allowing larger programs and more data to be stored and decreasing the time required to access information so stored. Relatively complicated word processing operations such as merging of files and sorting of items or records in a file can be performed with fixed disks much more readily than could have been performed previously with the use of floppy disks alone. Moreover, the marked decrease in access time allows greater efficiency of time sharing and resource sharing operations than systems heretofore available.

In accordance with the present invention, there is provided a controller for transferring data to a disk drive. The controller has an interface for receiving information to be transferred to the disk drive, a processor connected to the interface for controlling the transfer of information to the disk drive, and a temporary memory storage device connected to the processor. The temporary memory storage device or buffer operates on a first-in/first-out (FIFO) basis, although it is a psuedo rotating, stationary four-part buffer. Error correcting can be performed on the buffer level.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 1:
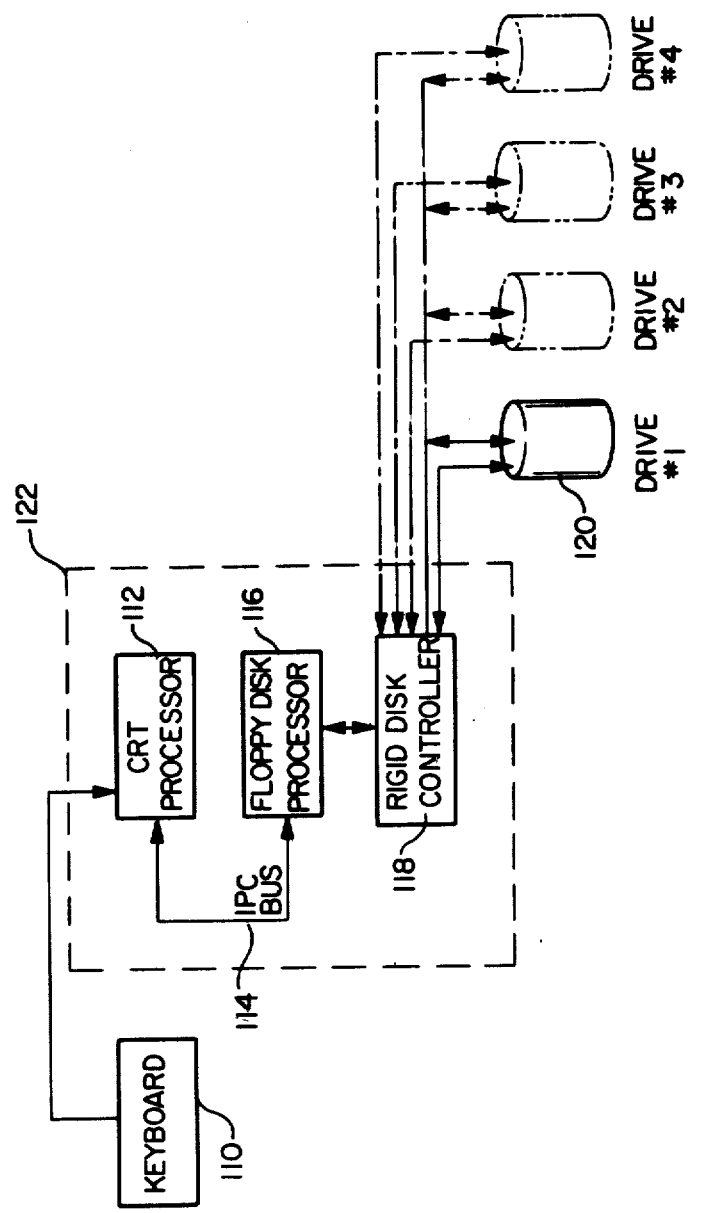
FIG. 1 is a block diagram of a typical word processing system configuration embodying the present invention.

Referring now to FIG. 1, the minimum configuration for a fixed disk controller includes a keyboard 110 operatively connected to a CRT processor 112 over an interprocessor communications (IPC) bus 114 to a floppy disk processor 116. A rigid disk controller 118, is connected to the floppy disk processor 116. Up to four rigid disk drives, shown generally at reference numeral 120, can be connected to the rigid disk controller 118. The disk drives 120 may be 5¼", 8" or 14" Winchester technology drives, such as Model No. SA1004 or other model numbers in the SA1000 series manufactured by Shugart Associates, Inc. or Model No. Q2040 or other model numbers in the Q2000 series manufactured by Quantum, Inc. The rigid disk controller 118, may be designed to fit in an encasement commonly called a floor module. The floor module electronics of the present invention consists of the CRT processor 112, the floppy disk processor 116 and the rigid disk controller 118 and is shown generally in phantom as reference numeral 122. A local network interface circuit board, not shown, can also be included in the floor module. The rigid disk controller 118 controls the disk drives 120, which contain hard or fixed disks, not shown, to provide the user with mass storage. These disks may contain data files and records as well as correspondence, all of which are generally grouped as data bases.

The disk drives 120 receive commands and instructions from an operator via the keyboard 110 into the data or word processing system.

From the keyboard 110, commands are decoded and passed to the floppy disk processor 116 by software. The floppy disk processor 116, in conjunction with the software in the system, requests data transfers of the rigid disk controller 118.

The rigid disk controller 118 is not a stand-alone controller in the system. It must be used in conjunction with the floppy disk processor 116. This is because the rigid disk controller 118 has no access to the IPC bus 114 or to the system bus, not shown.

Once the rigid disk controller 118 receives a data transfer or position command, in the case of a data transfer request from the floppy disk processor 116, the rigid disk controller 118 disconnects from the floppy disk processor 116 until the command is executed. At the conclusion of a read command, if no data errors are encountered, the rigid disk controller 118 passes to the floppy disk processor 116 an ending status, indicating that the command has terminated. If an error occurs during a disk read operation, the rigid disk controller 118 attempts to correct the error. If the error is correctable, the data is corrected and transferred via direct memory access (DMA) to a memory location in the floppy disk processor 116. At the conclusion of that operation, the floppy disk processor 116 is notified that the command has terminated.

In the case of a write command operation, the rigid disk controller 118 transfers a 256-byte block of data via DMA from the floppy disk processor 116 to the floppy disk processor onboard buffer. The requested sector and/or track of the disk specified by the command is then accessed. The 256-byte block of data is then transferred to the requested drive 120, and the floppy disk processor 116 is notified on completion of the operation.

If more than one block of data is desired, however, the floppy disk processor 116 initially loads an area in its memory with all the data to be transferred. The rigid disk controller 118 then transfers via a DMA operation the first block of data before beginning data transfer to the disk. Once the first block of data is successfully transferred, the data transfer is initiated on the selected drive 120. In parallel with the aforementioned operation, a fetch operation of the next data block is performed from the floppy disk processor's memory. Accordingly, on termination of the first data block transfer, the second data block is available for transfer. This increases the throughput of the system.

A similar sequence occurs for read command operations. During a read operation, the rigid disk controller 118 first reads one block of data from the disk drive 120 before it initiates a DMA transfer to the memory of the floppy disk processor 116. While the first data block is being transferred to the floppy disk processor 116, the second data block is fetched from the disk, and so on.

Figure 2:
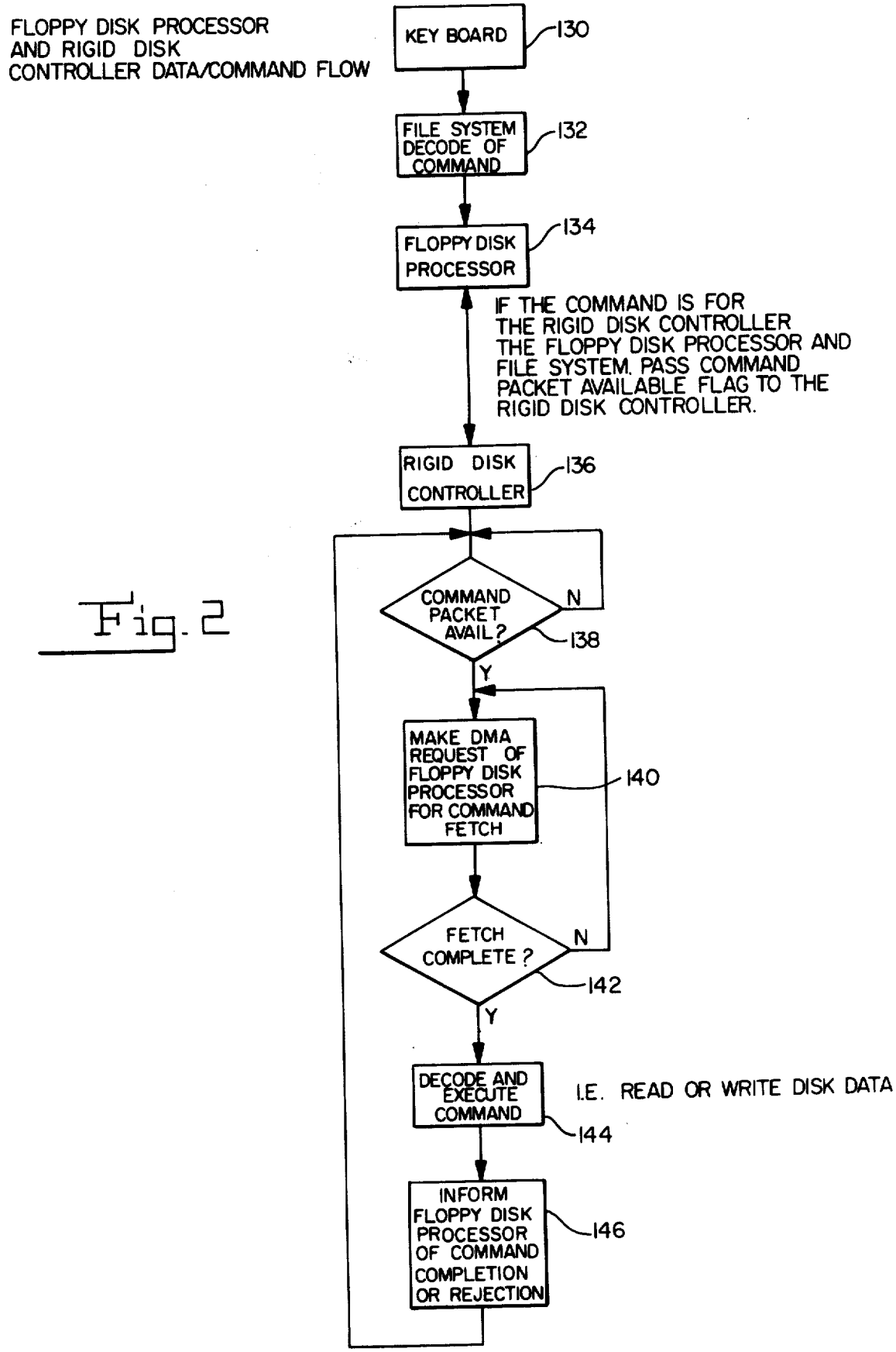
FIG. 2 is a flow chart representing system operations in accordance with the present invention.

Referring now also to FIG. 2, a flow chart of system operations is shown. Reference numerals for FIG. 2 beginning at number 130 and terminating at number 146 refer to flow chart or programming steps.

In order for the rigid disk controller 118 (FIG. 1) to access data, an operator initially makes a request at the keyboard, step 130 (FIG. 2). This request is passed via software to the file system, step 132. The software decodes the command and passes that decoded information to the floppy disk processor 116, step 134.

The rigid disk controller 118 in an idle state executes a programming loop on status, step 138. The status flag it seeks is called a COMMAND PACKET AVAILABLE flag. In the absence of a command from the floppy disk processor 116, the rigid disk controller 118 remains in this tightly controlled programming loop.

When the floppy disk processor 116 has a command available for the rigid disk controller 118, it initializes the COMMAND PACKET AVAILABLE flag. The rigid disk controller 118, on detecting the COMMAND PACKET AVAILABLE flag, initializes the data path sequencer to fetch the command packet from the floppy disk processor's memory, step 140. The data path sequencer, on executing the command packet fetch instruction, step 142, passes a status flag to the rigid disk controller 118. At that point, the rigid disk controller 118 decodes and executes the command, step 144.

Once the rigid disk controller 118 has decoded the command, the actual execution is done by the hardware format sequencer. On execution of the command, the rigid disk controller 118 informs the floppy disk processor 116 that the command has completed successfully or has been rejected, step 146. After notifying the floppy disk processor 116 of the command status, the rigid disk controller 118 returns to the programming control loop, step 138, to seek the next command to be passed to it from the floppy disk processor 116. The rigid disk controller 118 remains in this programming loop until it receives a command from the floppy disk processor 116.

Figure 3A:
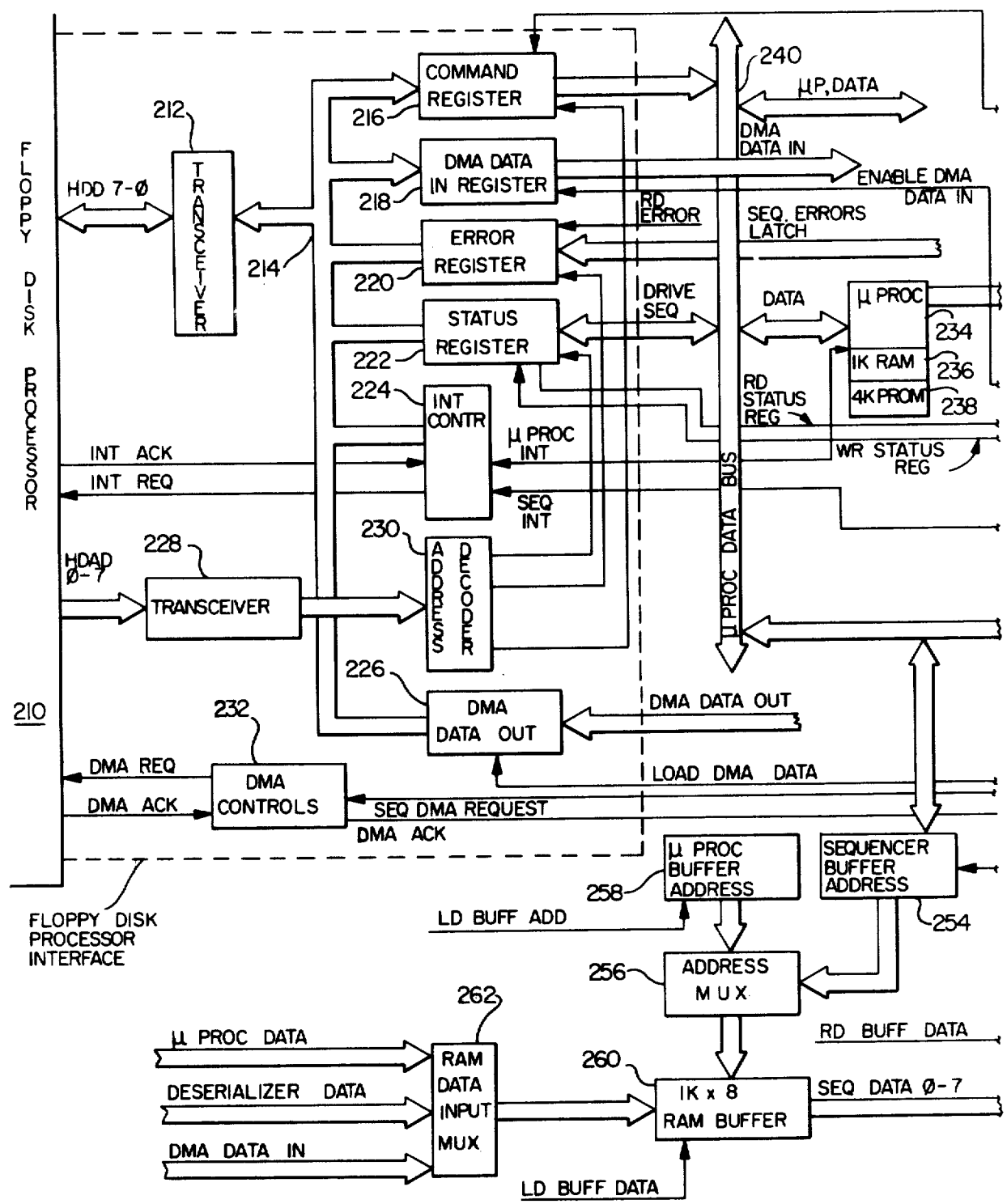
FIG. 3 is an interconnection diagram of FIGS. 3a and 3b which, taken together, are a block diagram of the fixed disk controller in accordance with the present invention.
Figure 3B:
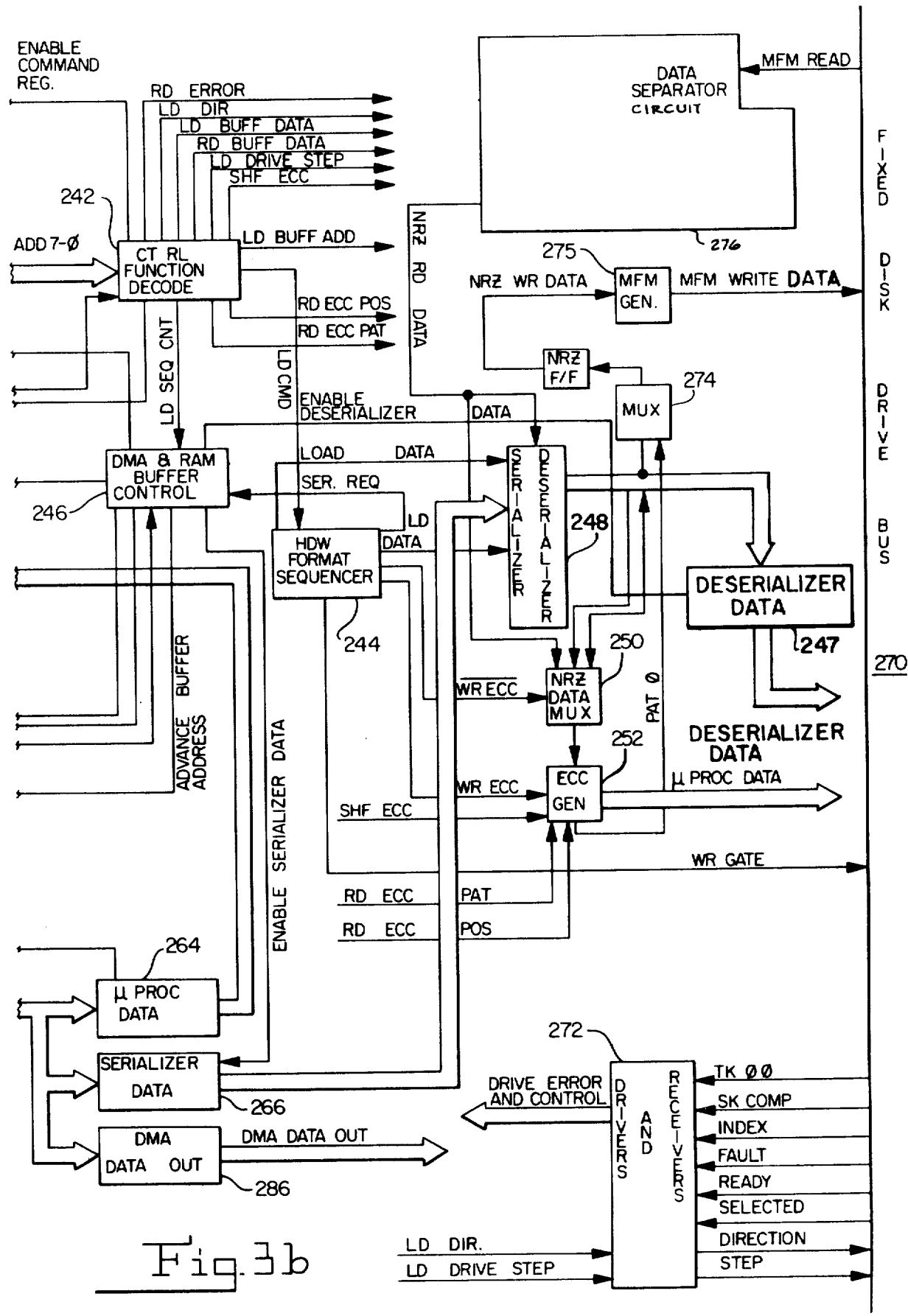

Referring now to FIG. 3, there is shown a more detailed block diagram of the fixed or rigid disk controller in accordance with the present invention. A floppy disk processor is provided at reference numeral 210. Connected to the floppy disk processor 210 over data lines labelled HDD7-0 are transceivers 212, such as Model No. 8304B manufactured by Advanced Micro Devices, Inc. (hereinafter AMD).

A communications bus 214 connects the transceiver 212 to registers and other devices. A command register 216, such as Model No. 74LS374 manufactured by AMD, is connected to the communications bus 214. A direct memory access (DMA) data in register 218, such as Model No. 74LS374 manufactured by AMD, is also connected to the communications bus 214. An error register 220, such as Model No. 74LS244 manufactured by Texas Instruments (hereinafter TI) is connected to the communications bus 214, as in a status register 222, such as Model No. 74LS374 manufactured by TI. Interrupt control logic, including Model Nos. 74LS74 and 74LS125, is provided at reference numeral 224 and is also connected to the communications bus 214. Finally, a DMA data out register 226, such as Model No. 74LS374 manufactured by AMD, is also connected to the communications bus 214.

Also connected to the floppy disk processor 210, over address lines labelled HDAD0-7 is a transceiver 228, such as Model No. 74LS244 manufactured by AMD, which in turn is connected to an address decoder circuit 230 including Model Nos. 74LS155, 74LS10, 74LS02 and 7425 manufactured by TI. DMA control circuitry 232 including Model Nos. 74LS123, 74LS74, 74LS244, 74LS32 and 74LS08 manufactured by TI is also provided to interface with the floppy disk processor 210 over lines marked direct memory access request (DMA REQ) and direct memory access acknowledge (DMA ACK).

A microprocessor 234, such as Model No. 8085-A manufactured by the Intel Corp. (hereinafter Intel), is provided to interface with the status register 222. Connected to the microprocessor 234 are a 1K×8 byte random access memory (RAM) 236, such as Model No. 2114 manufactured by Intel, and a 4K programmable read only memory (PROM) 238, such as Model No. 2716-1 manufactured by Intel. A data buffer such as Model No. 8304B (not shown) and an addres latch, such as Model No. 74LS373 (not shown) both manufactured by AMD, are located between the microprocessor 234 and both memory devices 236 and 238. A microprocessor data bus 240 is provided to interface the microprocessor 234 and memory devices 236 and 238 over a data line to the command register 216 and to the status register 222.

Connected to the microprocessor 234 over address lines ADD7-0 is a control function decoder circuit 242 including Model Nos. 74LS138 and 74LS02 manufactured by TI. A load command line is provided from the control function decoder circuit 242 to a hardware format sequencer 244, which consists of two devices such as Model No. 74LS138 manufactured by TI.

A DMA and RAM buffer control 246, such as Model Nos. 74LS138 and 74LS08 manufactured by TI, AMD, and the Signetics Corp. (hereinafter Signetics), is connected to the data path sequencer 244 to provide DMA and RAM buffer control.

Sequencer DMA request and DMA acknowledge lines are connected between the buffer control 246 and the DMA controls 232. The buffer control 246 is also connected to the DMA data out register 226 via a LOAD DMA DATA line, and to the interrupt control 224 via a SEQUENCER INTERRUPT line. A line from the buffer control 246, ENABLE DESERIALIZER DATA, is applied to a deserializer data latch 247, such as a Model No. 74LS374. The output of this deserializer data latch 247 is applied to the RAM data input multiplexer 262. A LOAD DATA line is generated by the hardware format sequencer 244 and applied to a serializer/deserializer 248, which consists of two devices such as Model No. 74LS95 manufactured by Signetics. Connected to this serializer/deserializer 248 is a non-return-to-zero (NRZ) data multiplexer 250, such as Model No. 74LS51 manufactured by AMD. A line is provided from the NRZ data multiplexer 250 to an error correcting code (ECC) generator 252 manufactured by TI.

ECC Generator Operation

The ECC generator operation 252 is used during a write operation to generate four check bytes which are appended to the data field. These four check bytes are the remainder which results when the data field is divided by the polynomial:

$$x^{31}+x^{29}+x^{20}+x^{10}x^9+1.$$

During a read operation, the data which is being read plus the four ECC check bytes are also divided by the same polynomial. If no error is detected, the result should equal zero. If, however, an error is detected, the rigid disk controller microprocessor 234 enters its error correction subroutine and begins clocking the ECC generator 252 with a signal labelled shift/ECC (SHF ECC) until one of two conditions exists: (1) the signal labelled ECC ERROR is zero or (2) the microprocessor 234 has executed 5736 shifts and the signal labelled ECC ERROR is high. If the latter occurs the microprocessor 234 sets an ECC HARD ERROR flag.

The ECC HARD ERROR flag indicates that the microprocessor 234 was unable to isolate the error or that more than one bit is in error. If the former condition exists, the signals labelled PAT0 through PAT11 contain the failing bit pattern and the contents of the microprocessor's B, C, D and E registers contain the position in memory of the failing data bit.

The ECC generator 252 can detect an error in a 22-bit burst and can correct a single bit error in an 11-bit field.

A buffer address counter 254, which consists of six devices, such as Model No. 74LS193 manufactured by TI, is connected to the buffer control 246 by an ADVANCE BUFFER ADDRESS line and an ADVANCE DMA ADDRESS CONTROL line. The buffer address counter 254, in turn, is connected to an address multiplexer 256, which consists of three devices such as Model No. 74LS157 manufactured by TI, to which address multiplexer 256 is fed signals from the buffer address counter 254 as well as from a microprocessor buffer address register 258.

The address multiplexer 256 is connected to a 1K×8 byte RAM buffer 260, such as Model No. 2148 manufactured by Intel. The RAM buffer 260 receives signals from the address multiplexer 256 as well as from a RAM data input multiplexer 262, which consists of three devices such as Model No. 74LS374 manufactured by AMD. Circuitry for processing microprocessor data is provided at reference numeral 264, which consists of Model Nos. 8304B and 74LS08 manufactured by AMD and is connected via a sequencer data 0-7 bus to the RAM buffer 260 and to the microprocessor data bus 240. A serializer data register 266, such as Model No. 74LS374 manufactured by AMD, is connected to the microprocessor data circuit 264, the output of which data serializer 266 is applied to the serializer/deserializer 248. A DMA data out register 268 is connected to the RAM buffer 260, to the microprocessor data circuit 264, and to the serializer data register 266.

A fixed disk drive bus is provided at reference numeral 270. The fixed disk drive bus 270 transfers data to and from drivers and receivers 272, which consist of devices such as Model Nos. 7438 and 74LS14 manufactured by TI.

A multiplexer is provided at reference numeral 274, such as Model No. 74S51 manufactured by TI. The multiplexer 274 receives information from the ECC generator 252. The multiplexer 274 generates a non-return-to-zero write data (NRZ WR DATA) signal via an NRZ flip flop, such as Model No. 74LS74 manufactured by TI, to a modified frequency modulated (MFM) generator 275 manufactured by TI, and a Model No. DL1708 delay line manufactured by Valor Elect., Inc. The output of the MFM generator 275 is a series of clock and data pulses referred to as an MFM WRITE DATA signal for writing data on one of four fixed disk drives connected to the fixed disk drive bus 270.

A modified frequency modulated read (MFM READ) signal is applied to a data separator 276, such as Model No. WD1000 Winchester Disk Controller manufactured by the Western Digital Corporation of Irvine, Calif.

Error Detection and Correction

Frequently communication systems employ two-way channels, a fact that must be considered in designing communications systems and signals for use therewith. With a two-way channel, for example, an error detecting code can be used. When an error is detected at one terminal, a request for a repeat transmission can be given, and thus errors can effectively be corrected.

There are true examples of one-way channels, in which error probabilities can be reduced with error correcting codes but not by error detection and retransmission. With a magnetic disk storage system, for example, if errors are detected when the record is read, it is too late to ask for a retransmission after the disk has been stored for a week or for a month.

Encoding for error correcting codes is no more complex than is encoding for error detection; it is the decoding that is likely to require complex equipment.

There are several reasons for using error detection and retransmission when possible. Error detection is by its nature a much simpler task than error correction and requires much simpler decoding equipment. Also, error detection with retransmission is adaptive. Transmission of redundant information is increased when errors occur. This makes it possible under certain circumstances to achieve better performance with a system of this kind than is theoretically possible on a one-way channel.

There is a limit, however, to the efficiency of a system that uses simple error detection alone. Short error detecting codes cannot detect errors efficiently, while if extremely long codes are used, retransmission must be performed too frequently. A combination of correction of the most frequent error patterns coupled with detection and retransmission for less frequent error patterns is not subject to this limitation and, in fact, is often more efficient than either error correction or detection and retransmission alone.

In addition to storing bits of data on a medium such as a disk, extra bits must be stored for a system to detect and/or correct errors. In the ASCII standard, each alphanumeric character is represented by seven bits. An eighth bit may be added to each character in storage, as a parity bit or check bit, to aid in determining whether the preceding seven bits are correct. The value of the parity bit is zero if the preceding seven bits add up to an odd number and one if they add up to an even number.

The checksum, which is an accumulation of the remainder of modulo 256 addition of a string of data organized in bytes, is a method of error detection easily generated and usually effective in detecting errors. Often, in the case of data which is coded into ASCII characters that represent the data in hexadecimal form, the checksum is taken over the values of the hex numbers rather than over the actual bit patterns themselves. Typically, the initial value of the eight-bit checksum is minus one. This is so that when zero occurs often in the data, the effectiveness of the code is not diminished.

The use of parity bits can aid in locating an error only to within the preceding seven bits. A more complex (Hamming) code employs a greater number of check bits and yields the precise address of a single bit that is in error. The correction of the error then requires simply the conversion of a one into a zero, or the reverse.

In a cyclic redundancy code (CRC) scheme, data bits are treated as the coefficients of a polynomial which is manipulated algebraically to yield a smaller set of bits. These bits are stored and retrieved to reconstruct data in the event of an error or a burst of errors, which is more likely to occur on magnetic disks.

Much coding theory has been based on the assumption that each symbol is affected independently by noise, so that the probability of a given error pattern depends only on the number of errors. Codes have been developed, for example, that correct any pattern of t or fewer errors in a block of n symbols. While this may be an appropriate model for some channels, on magnetic disk storage systems errors occur predominantly in bursts. Magnetic disk defects are typically larger than the space required to store one symbol. Consequently, codes for correcting bursts of errors are required.

Codes are usually described in mathematics as closed sets of values that comprise all the allowed number sequences in the code. In data communication, transmitted numbers are essentially random data patterns which are not related to any predetermined code set. The sequence of data, then, is forced into compliance with the code set by adding to it at the transmitter. Thus, a string of original data becomes the original string concatenated with a string of extra numbers that make the total spring one of allowed code set values.

At the receiver, incoming data is checked to determine whether it is one of the allowed code set values. The assumption is made that if an error occurred in transmission, likelihood of the result also being a valid set member is very low. If the received data string is found to be of the allowed code set, it is assumed that no errors have occurred and that the data is valid.

A scheme has heretofore been developed by determining what precise extra string to append to the original data stream to make the concatenation of transmitted data a valid member of the code set. A consistent way exists of extracting the original data from the code value at the receiver and to deliver the actual data to the location where it is ultimately used. For the code scheme to be effective, the set must contain allowed values sufficiently different from one another that expected errors are not able to alter one allowed value such that it becomes a different allowed value of the code set.

The CRC code set consists of strings of binary data evenly divisible by a generator polynomial, which is a selected number that results in a code set of values different enough from one another to achieve a low probability of an undetected error. To determine what to append to the string of original data, a division is made of the original string as it is being transmitted. When the last data is past, the remainder from the division is the required string that is added since the string including the remainder is evenly divisible by the generator polynomial. Because the generator polynomial is of a known length, the remainder added to the original string is also of a fixed length.

At the receiver, the incoming string is divided by the generator polynomial, and if the incoming string does not divide evenly, that is, if the remainder after division is not zero, then an error is assumed to have occurred. If the remainder is zero, the data is assumed to be error free, and the data delivered to the ultimate destination is the incoming data with the fixed length remainder field removed.

The longitudinal redundancy code (LRC) is a special case of CRC where the particular generator polynomial chosen results in the same CRC code as would be obtained by performing a 16-bit wide exclusive OR operation once every 16 bits. If the data stream were represented as a succession of 16-bit words, the LRC code added to the end of the stream would equal the first word exclusive ORed with the second, exclusive ORed with the third, and so on. When the check is made at the receiver, the result is zero if no errors occurred. This is simply because the exclusive OR of any value with itself is zero.

As hereinabove implied, the rules under which a system encoder and decoder operate are specified by the particular code that is employed. One fundamental type of error correcting code is a block code. The encoder for a block code breaks the continuous sequence of information digits into k-symbol sections or blocks. It then operates on these blocks independently according to the particular code to be employed. With each possible information block is associated an n-tuple of channel symbols, where n is greater than k. The result, called a code word, is transmitted, possibly corrupted by noise, and decoded independently of all other code words. The quantity n is referred to as the code length or block length.

At the receiver a decision is made, on the basis of the information in the received n-tuple, concerning the code word transmitted. This decision is a statistical decision. That is, it is of the nature of a best guess on the basis of available information and is therefore not infallible.

Figure 4A:
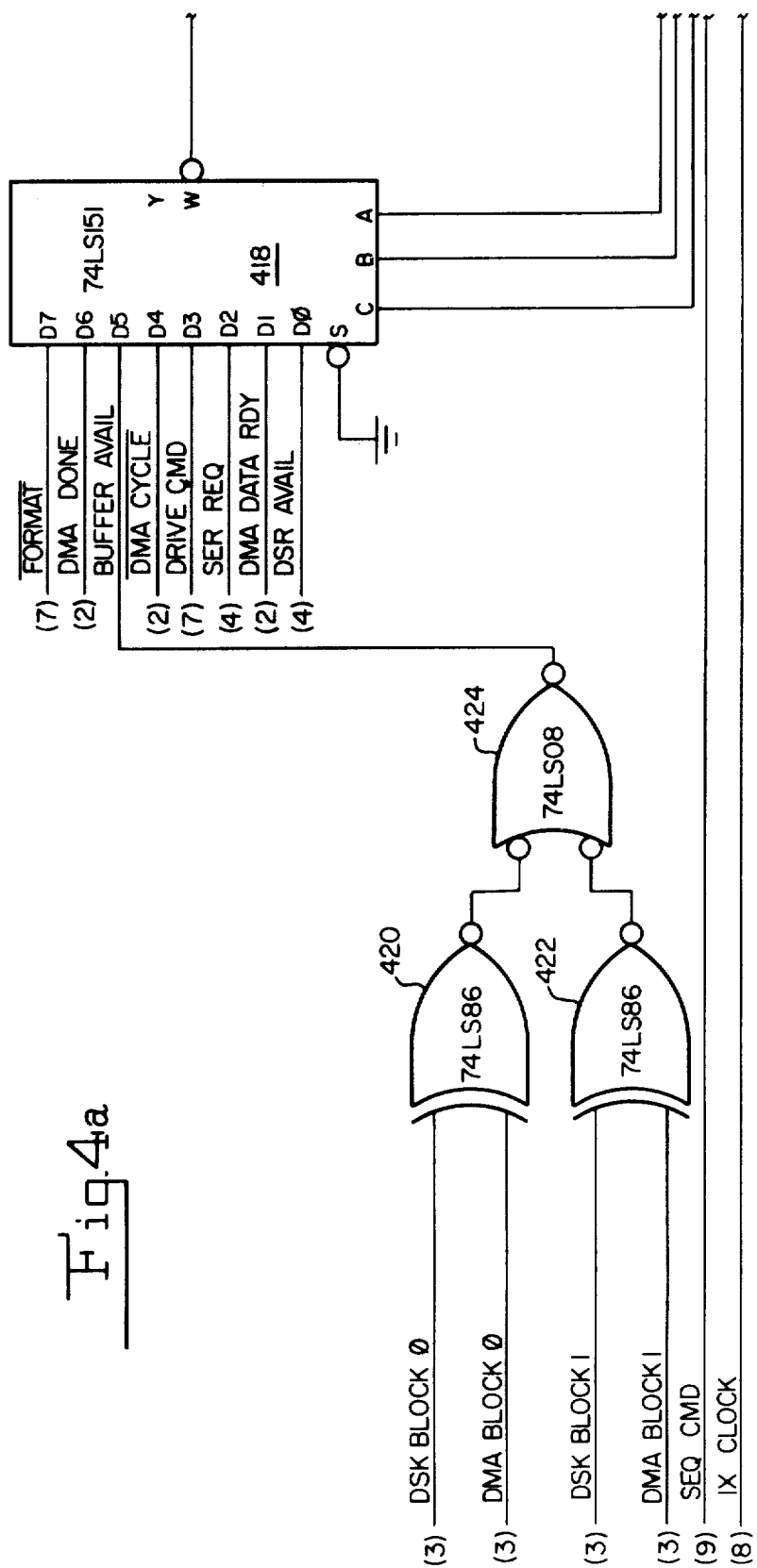
FIG. 4 is an interconnection diagram of FIGS. 4a through 4c which, taken together, are a schematic diagram of the data path sequencer of the present invention.
Figure 4C:
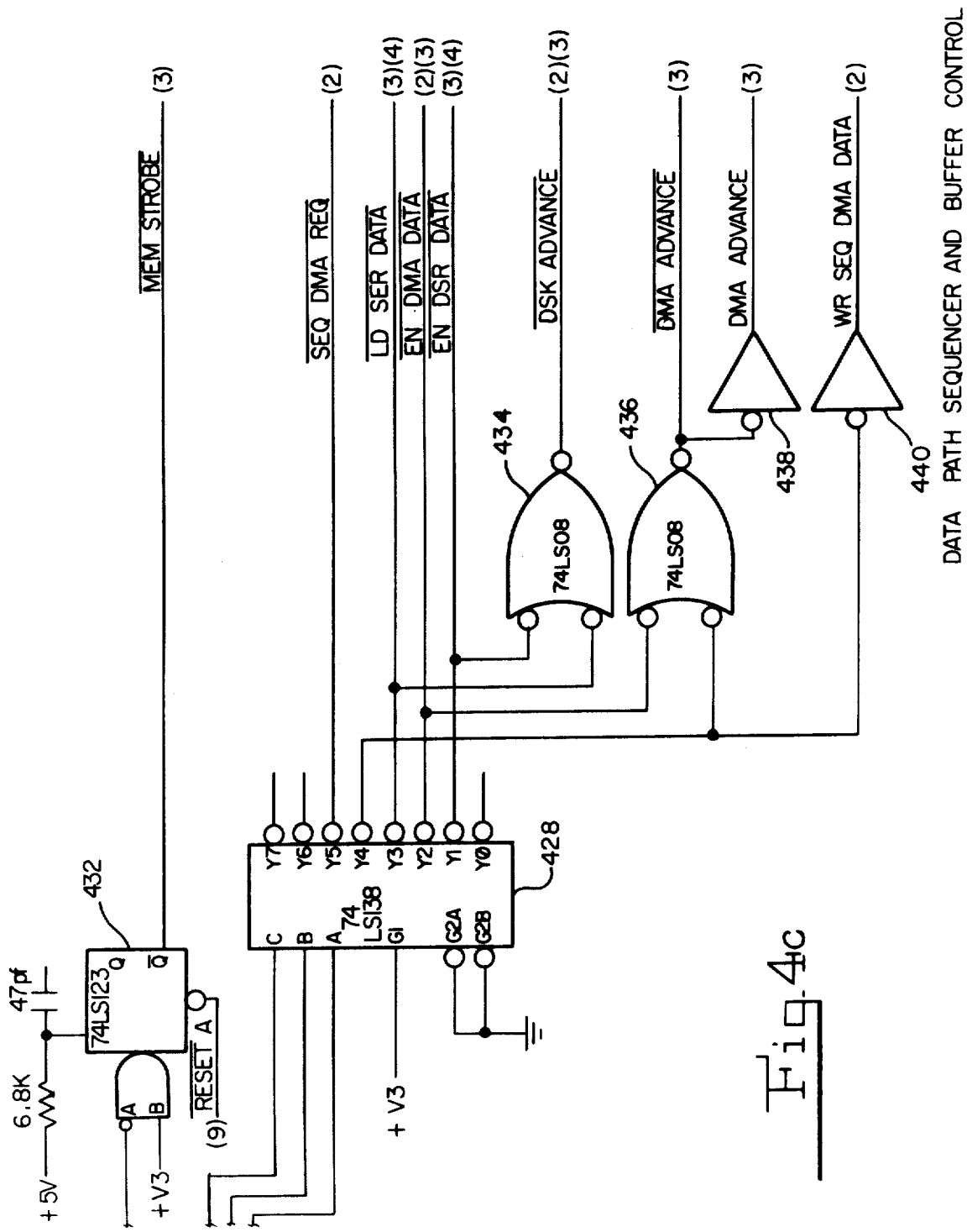

Referring now also to FIG. 4, the data path sequencer is shown. The data path sequencer transfers data via DMA operations to or from the memory of the floppy disk processor 116 into the rigid disk controller 118, to control DMA requests of the floppy disk processor memory, and to advance the rigid disk data buffer address.

The data path sequencer consists of 32×8 byte random sequencer logic. The main component is a Model No. 2911 sequencer 410 manufactured by AMD, which is a 4-bit sequencer with the capability of pushing data on and popping data off a stack register. The data path sequencer also includes a Model No. 29811 next address control unit 419 manufactured by AMD, and a Model No. 74LS151 status multiplexer 418 manufactured by TI.

Operation of the data path sequencer is initialized by a sequence command (SEQ CMD) control signal into the sequencer 410. This signal releases the sequencer 410 to allow it to begin its initialization. The sequencer 410 is initialized by removing the zero (ZERO) signal therefrom. At address 0 of the sequencer 410, a PROM memory 412 and 414 is accessed. The PROM memory 412 and 414 is a 32×8 byte device such as Model No. 82S123 manufactured by Signetics. The contents of the PROM memory 412 and 414 are made available to the sequencer pipe line register 416 and 426. This register latches the contents of the PROM memory 412 and 414 for decode execution by the data path sequencer.

A portion of the output of the sequencer pipe line register 416 is fed into the status multiplexer 418, selector inputs. Three signal lines, labelled A, B, and C, are used to select one of eight conditions present at the input of the status multiplexer 418. The selected item of data is then fed into the next address control unit 419, where a test is performed on the condition. This test is to determine whether the selected input is valid. If it is valid, sequencer 410 may be forced into a jump condition within the PROM memory 412 and 414. That is, a different address may be forced onto input ports Y0 through Y3 of the sequencer 410. In the event that the output of the next address control unit 419 indicates that the condition selected by the status multiplexer 418 is not valid, then the sequencer 410 accesses the next sequential memory location of the PROM memory 412 and 414, and selects a different condition. In the event of a format command, the sequencer 410 selects a previous condition.

If a disk read operation is performed, a sequencer read (SEQ READ) line which is applied to the PROM memory 412 and 414, is active (i.e., in a low state). The PROM memory 412 and 414 is addressed from address 0 through 15. A read operation indicates to the sequencer 410 that a disk read is taking place, and that data is being transferred from the disk drive 120 into the rigid disk controller 118. The data path sequencer, in a read mode, monitors the deserializer available (DSR AVAIL) line applied to the status multiplexer 418. This line indicates when a data byte is available from the disk drive 120 for storage into the sequencer RAM data buffer 260.

RAM Buffer Operation

On finding the DSR AVAIL signal active, the data path sequencer generates an enable deserializer data (EN DSR DATA) signal via device 428 to gate onto the sequencer data 0–7 bus the data from the serializer data register 266 and to store it in the sequencer RAM data buffer 260.

Termination of the EN DSR DATA signal advances the disk sequencer address to the next memory location, ensuring that the next data byte from a disk drive 120 through the deserializer 248 is not stored over the previous one. This operation continues until 256 bytes of data have been accumulated, at which point a decision is made as to whether a second data block is to be transferred.

If a second data block is to be transferred, the sequencer decides whether buffer space is still available. This decision is performed by monitoring gates 420, 422, and 424, the output of which is a buffer available (BUFFER AVAIL) line. If space is still available in the buffer 260 for the transfer of data, the sequencer begins to fetch the next sequential data block from the disk drive 120.

At the same time, the transfer of the previously fetched data block to the floppy disk processor memory is initiated by a sequencer DMA request (SEQ DMA REQ) signal generated by device 248. This transfer is performed on a byte-by-byte basis. The sequencer DMA request is made to the floppy disk processor 116. Once the floppy disk processor 116 has granted the DMA request, the DMA CYCLE bar signal becomes active, indicating to the sequencer that the floppy disk processor 116 has received the previous data byte.

If this byte of data is not the last byte of data in the sequencer RAM data buffer 260, the sequencer 410 reinitializes the sequencer DMA request. At the same time, it monitors the status from the deserializer 248 via the DSR AVAIL line, indicating when a byte of data has been fetched from the disk. This operation continues until 256 bytes of data have been transferred from the sequencer RAM data buffer 260 in the case of a single data block read operation. In the case of a disk read operation involving more than one block of data, the aforementioned process continues indefinitely or until the end of a track has been reached.

There are constraints on the transfer of data. The sequencer does not initialize the disk for the transfer of the next data block until buffer space is available. The BUFFER AVAIL signal indicates that less than four blocks (1024 bytes) of data are resident in the sequencer RAM data buffer 260.

It is possible that four blocks of data can reside in the sequencer RAM data buffer 260 with no space available. In such a case, if another byte of data is loaded into the sequencer RAM data buffer 260, the contents thereof are no longer valid. The data path sequencer 410 enters a floppy disk processor DMA control mode at this point to create data space. Once a block of data space exists, the lower portion of the sequencer RAM data buffer 260 is readdressed, placing the buffer 260 in a psuedo rotating operating mode. That is, initially blocks 0 through 3 of the buffer 260 are loaded sequentially with the first four blocks of data. The fifth block of data is loaded in the same memory area of the buffer 260 as the first block (block 0) was loaded. This operation is continued until either an entire track of data has been transferred or the operation is otherwise terminated (e.g., less than an entire track of data is transferred). The new data overwrites the previous data. Data is not continuously shifted through memory.

In the event that a read error on a block of data is encountered and detected by the ECC logic of the rigid disk controller 118, the data path sequencer 410 ceases making disk data requests until it corrects or attempts to correct the defective data. Some data errors are not correctable.

Gate 430 and one-shot 432 create a memory write strobe. This strobe is shorter in pulse width than the enable signals for the data latches. Gate 434, in conjunction with device 428, generates a disk advance (DSK ADVANCE) signal. This signal advances the disk portion of the address counter to the memory when an operation involves the transfer of data to or from the serializer/deserializer 248. Gate 436 generates a DMA ADVANCE signal to advance the DMA address portion of the memory address counters. This signal is activated whenever an operation involves the DMA channel and data is transferred to the floppy disk processor 116. The DMA ADVANCE line selects the DMA address counter, not the disk address counter. A write sequencer DMA data (WR SEQ DMA DATA) signal is generated by device 428 via inverter 440 to store the data to be written into the floppy disk processor memory on the granting of a DMA cycle.

Figures 5A, 5B:
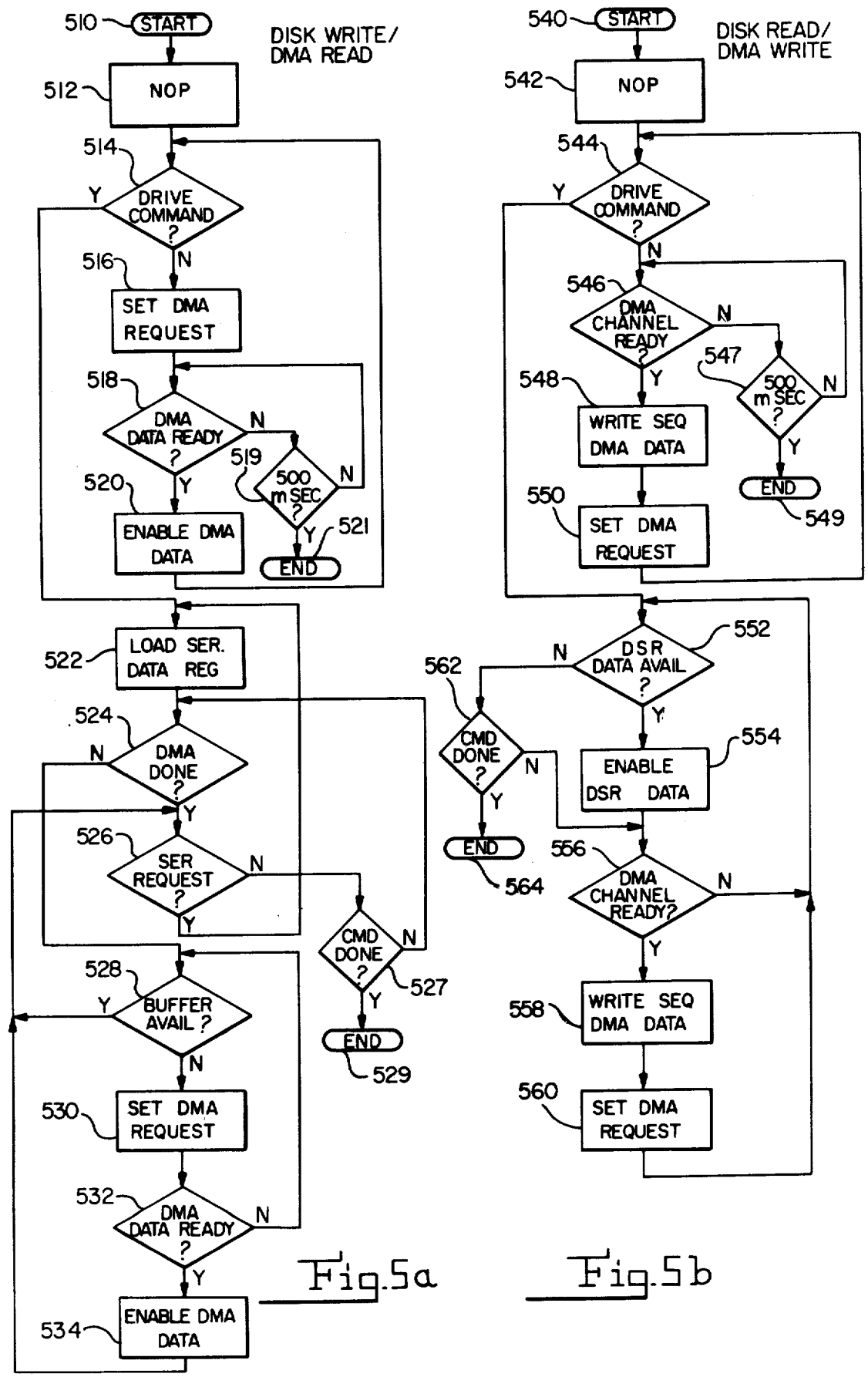
FIG. 5a is a flow chart representing disk write and DMA read operations of the data path sequencer in accordance with the present invention.
FIG. 5b is a flow chart representing disk read and DMA write operations of the data path sequencer in accordance with the present invention.
Figure 6A:
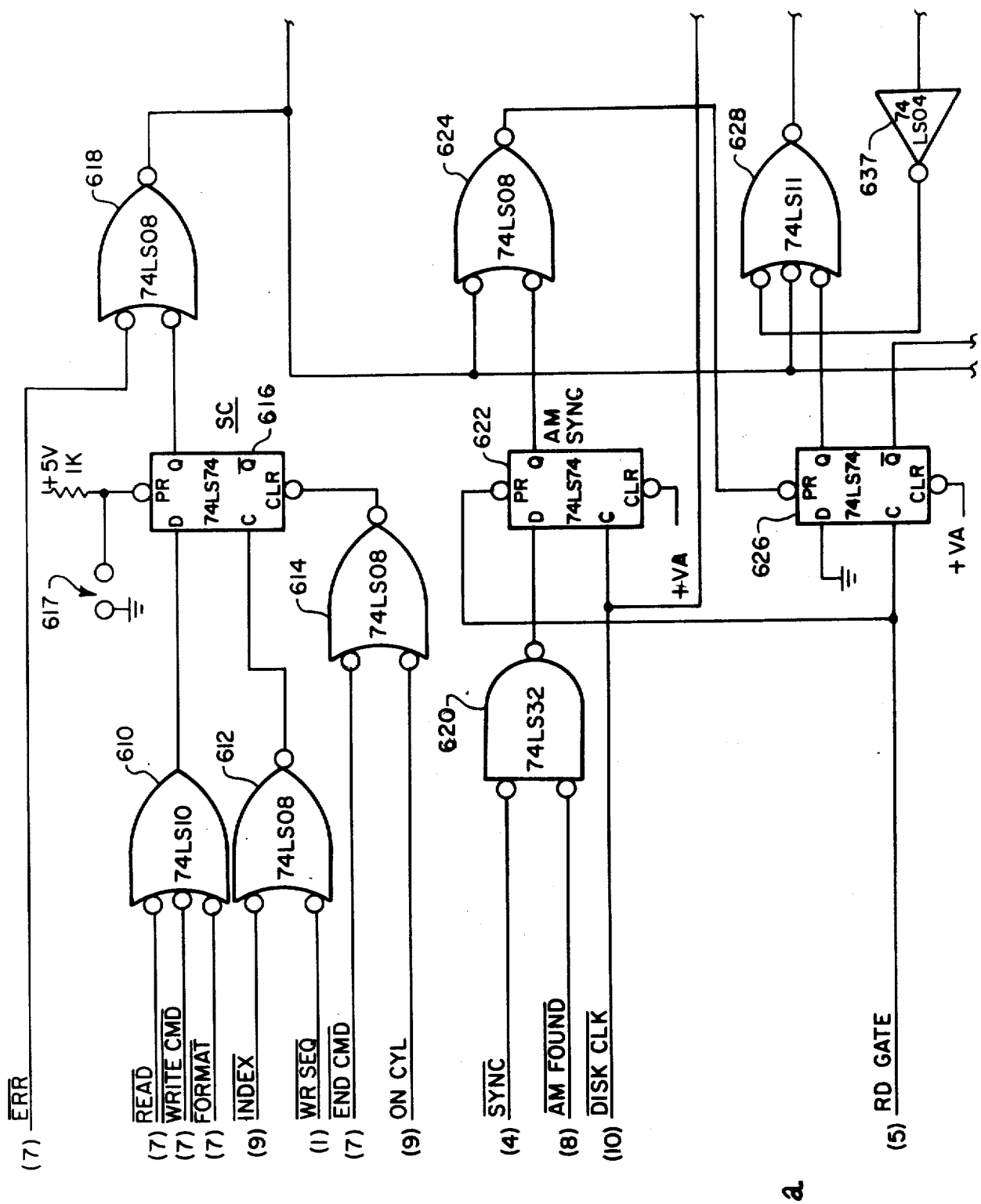
Figure 6B:
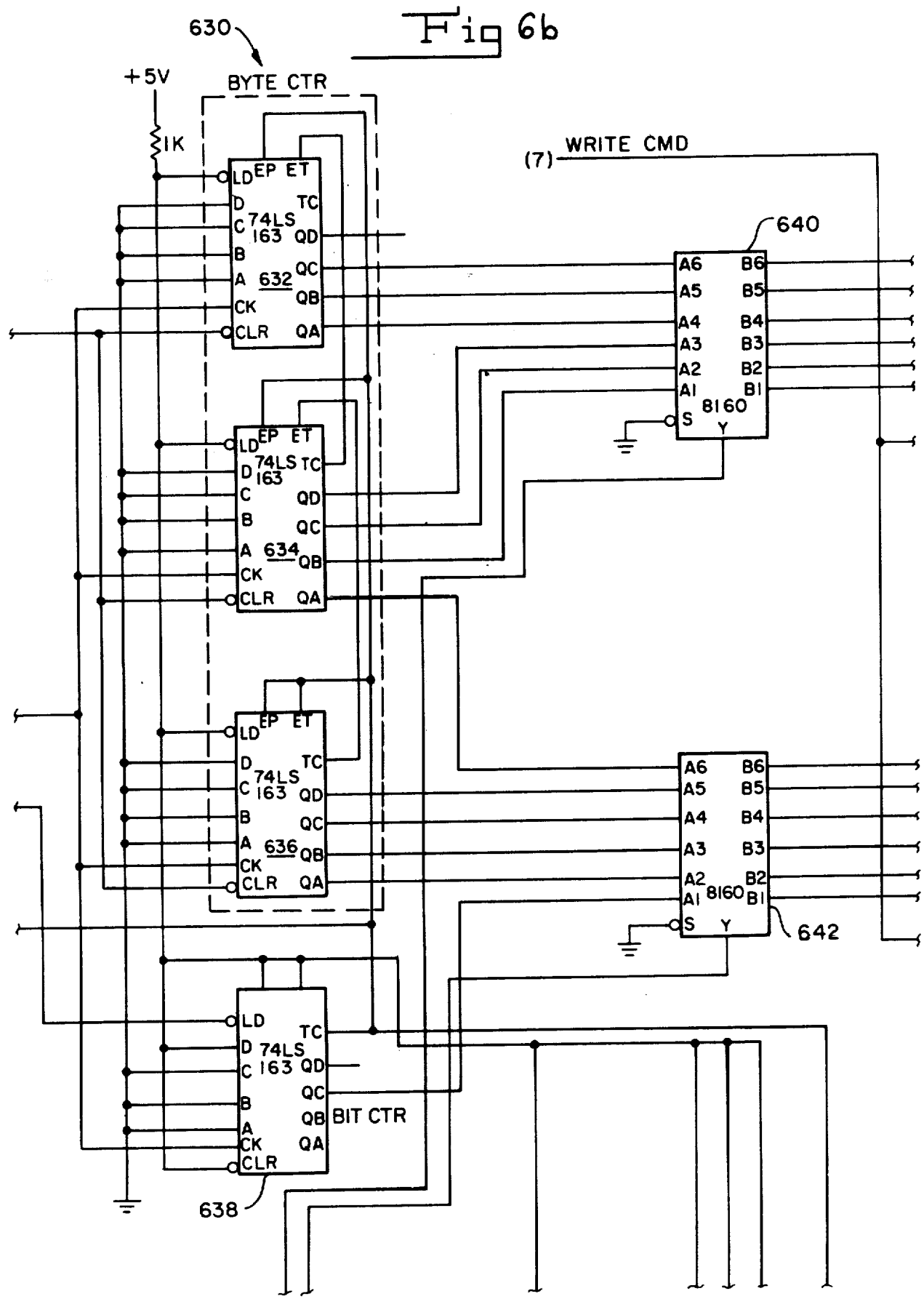
Figure 6C:
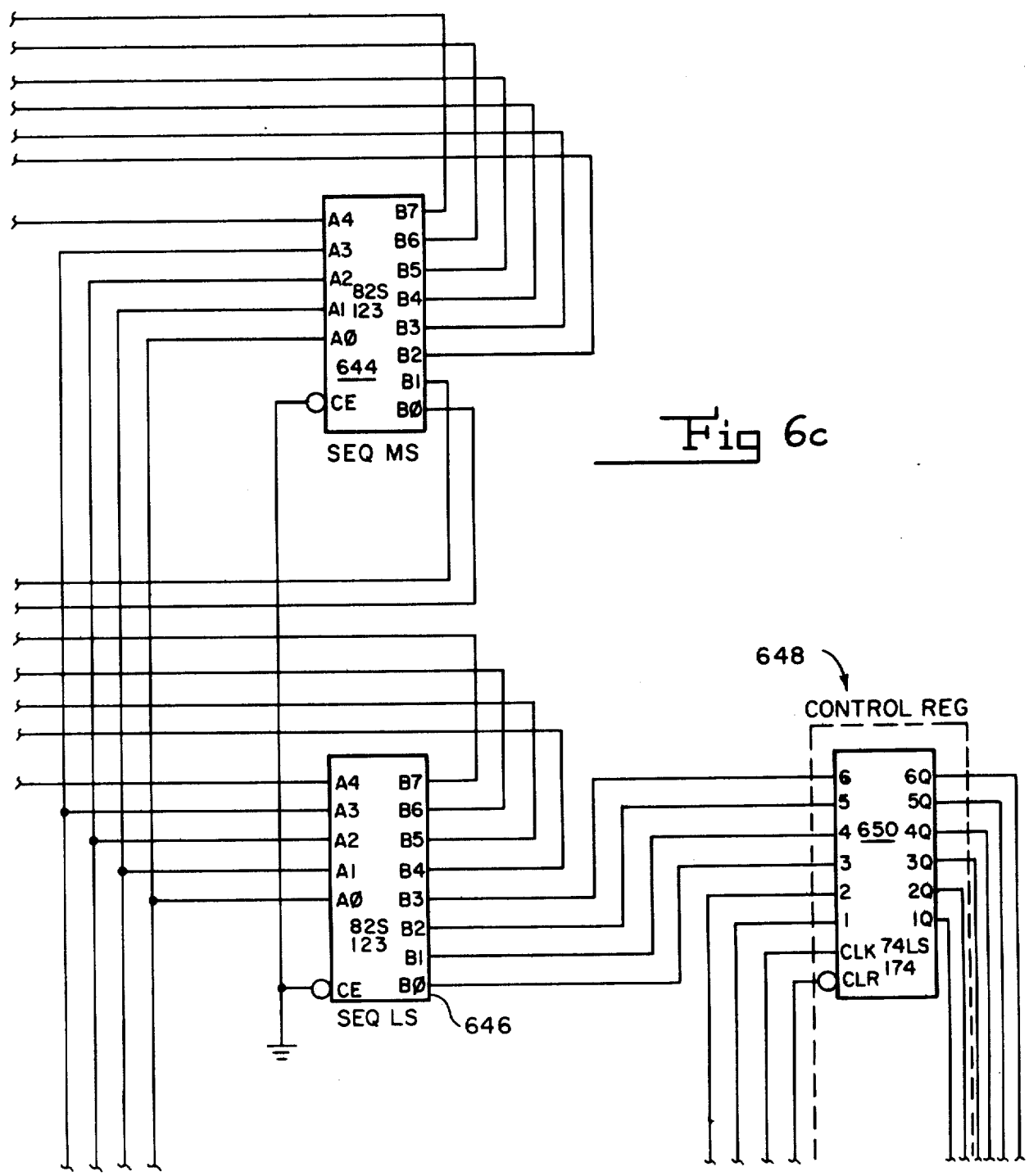
Figure 6D:
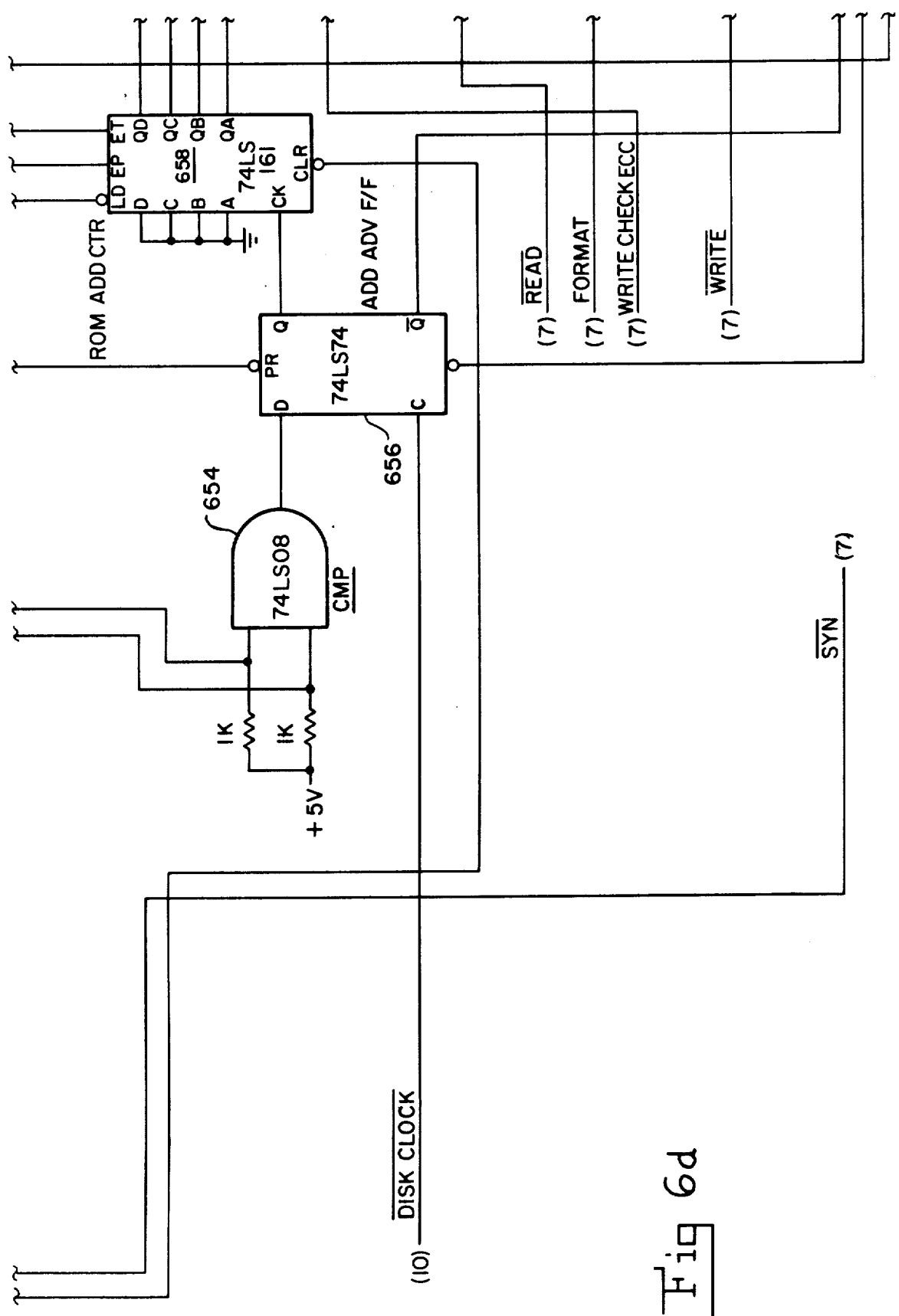
Figure 6E:
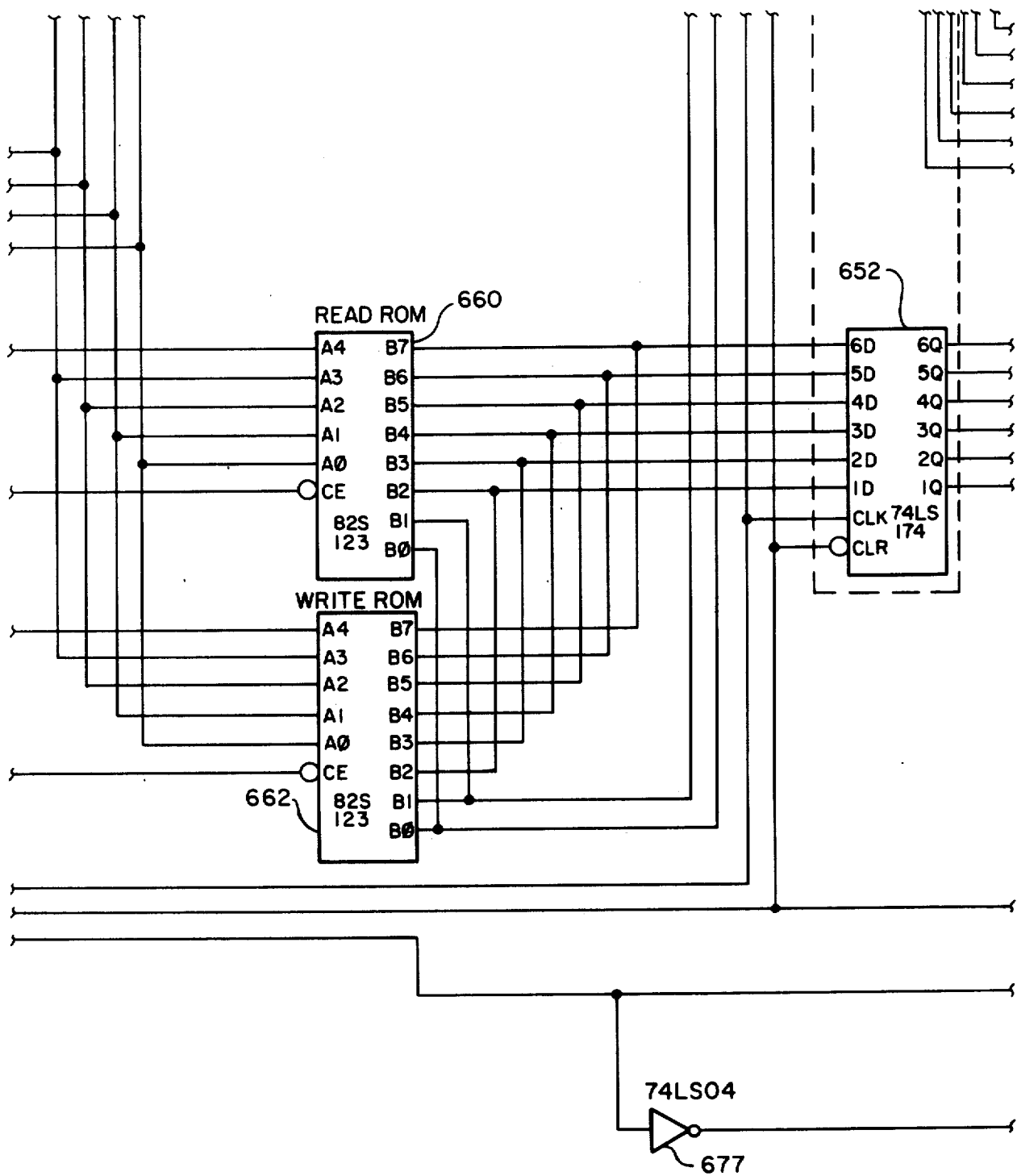
Figure 6F:
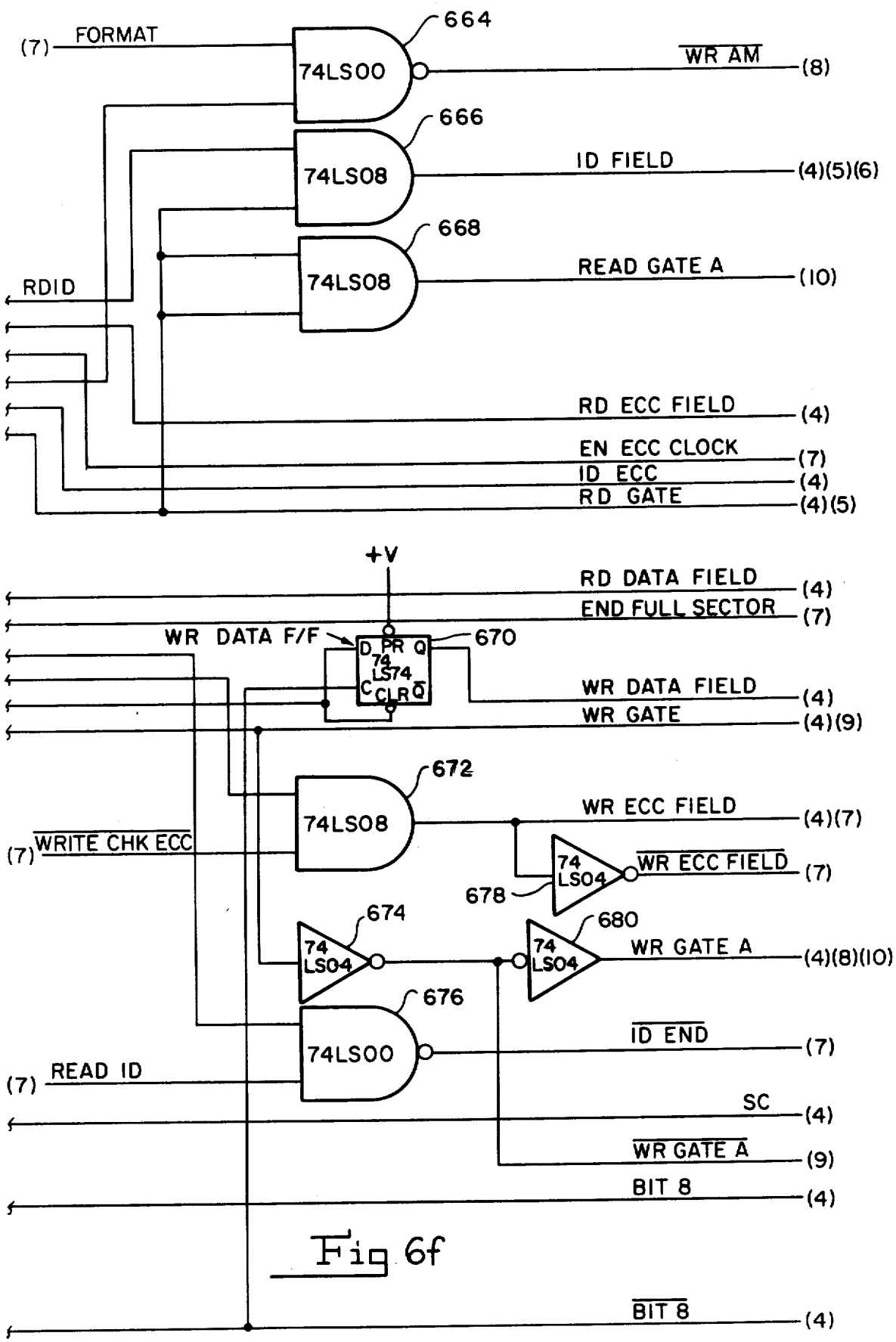
Figure 11A:
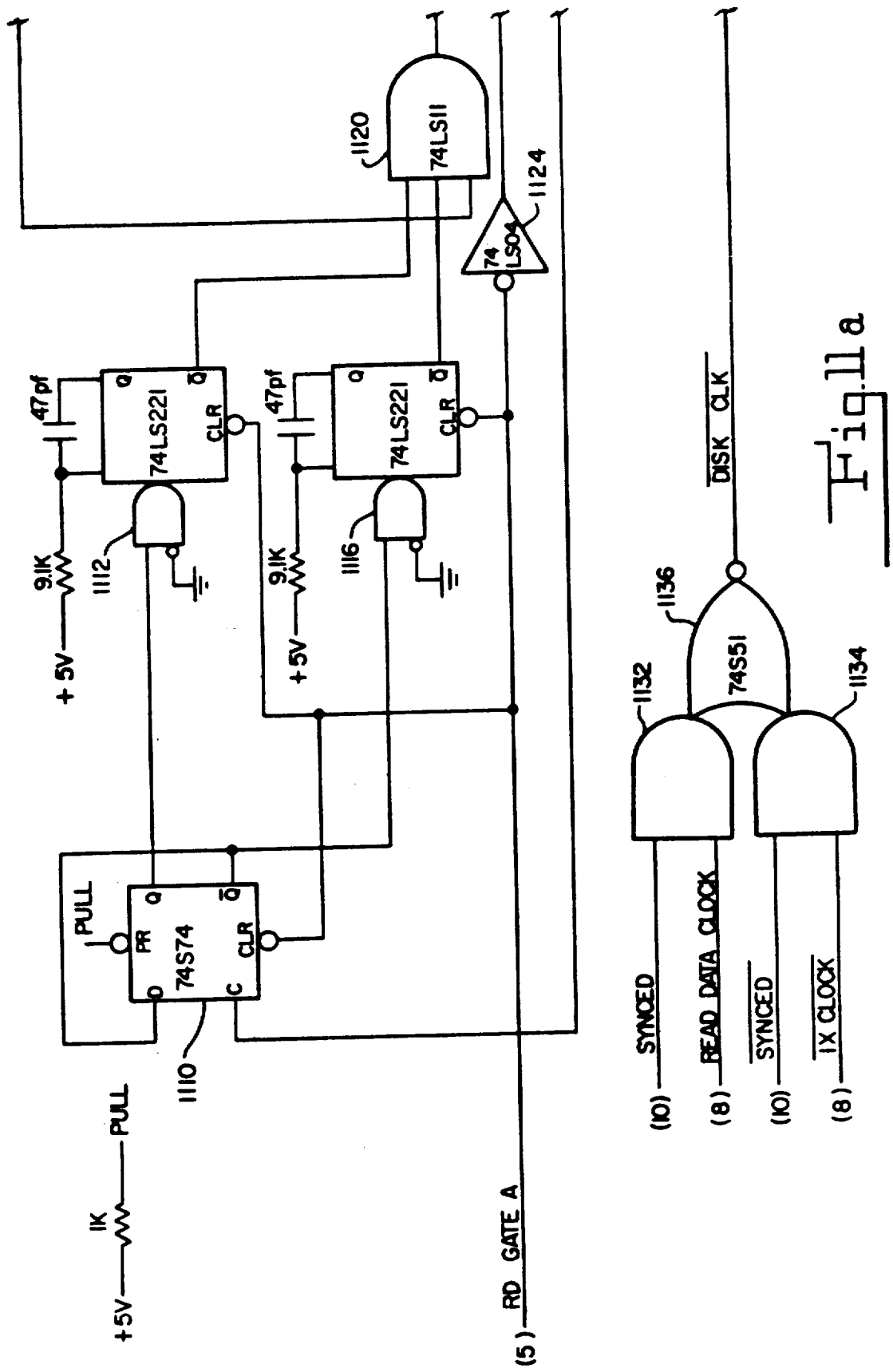
Figure 11B:
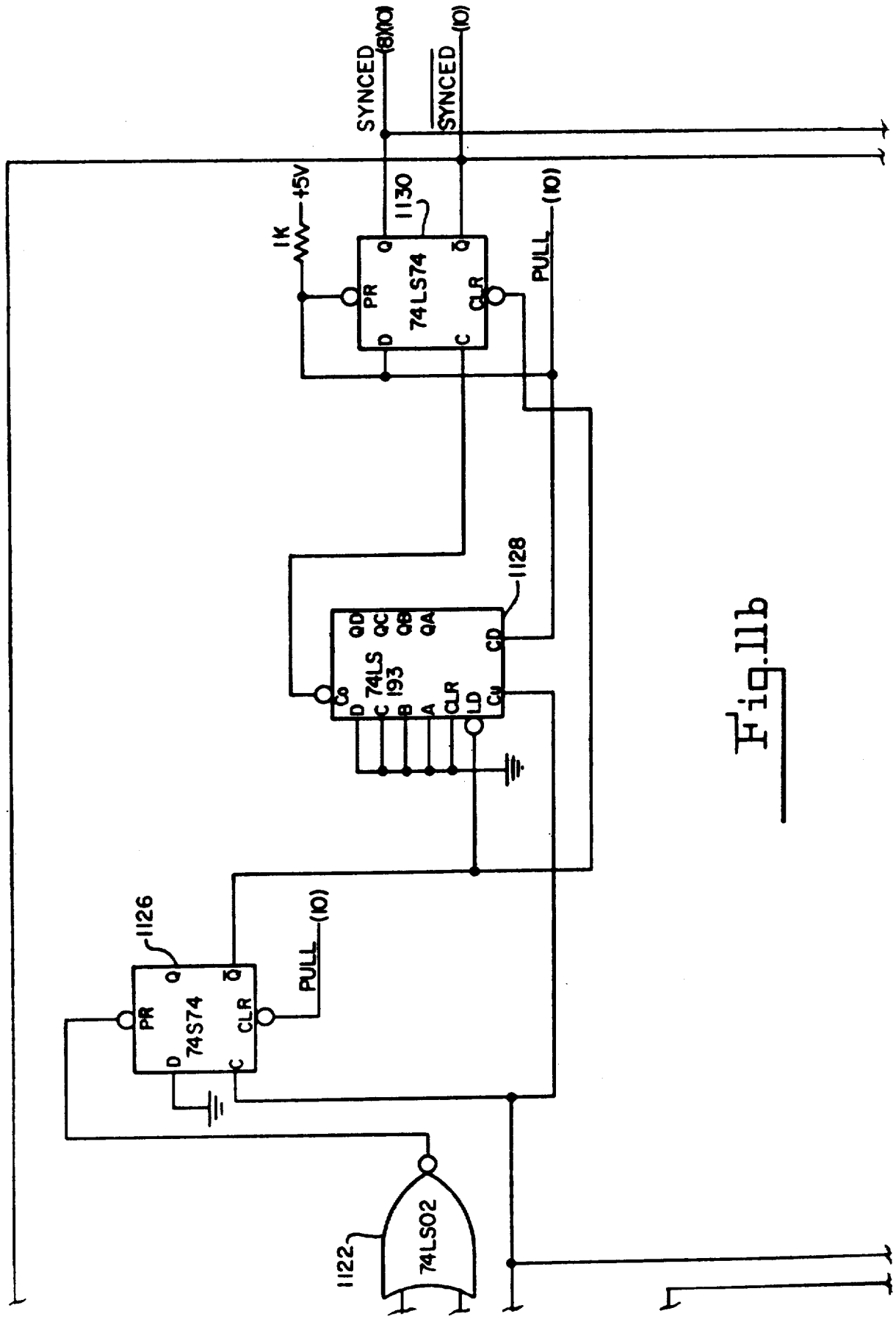
Figure 11C:
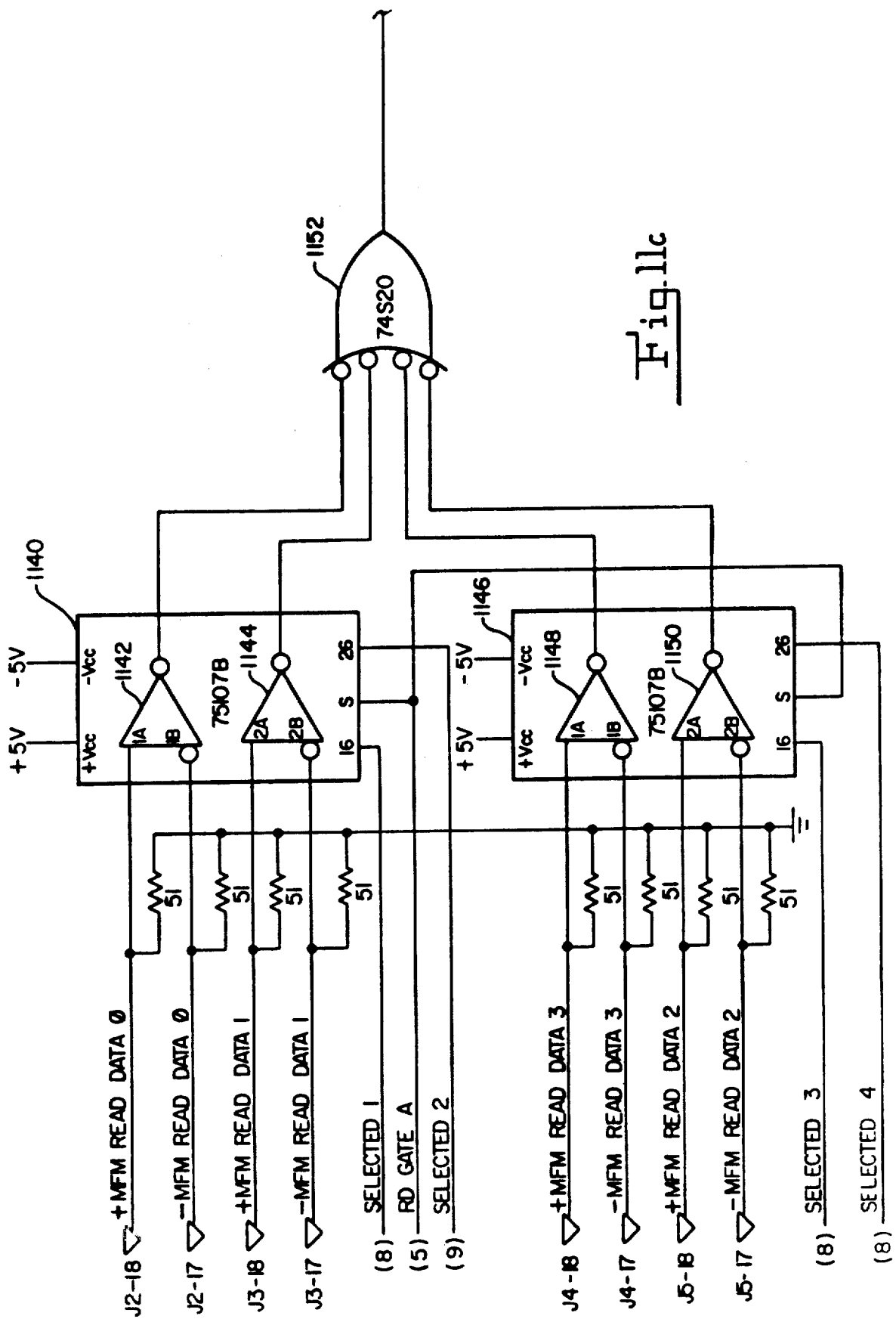
Figure 11D:
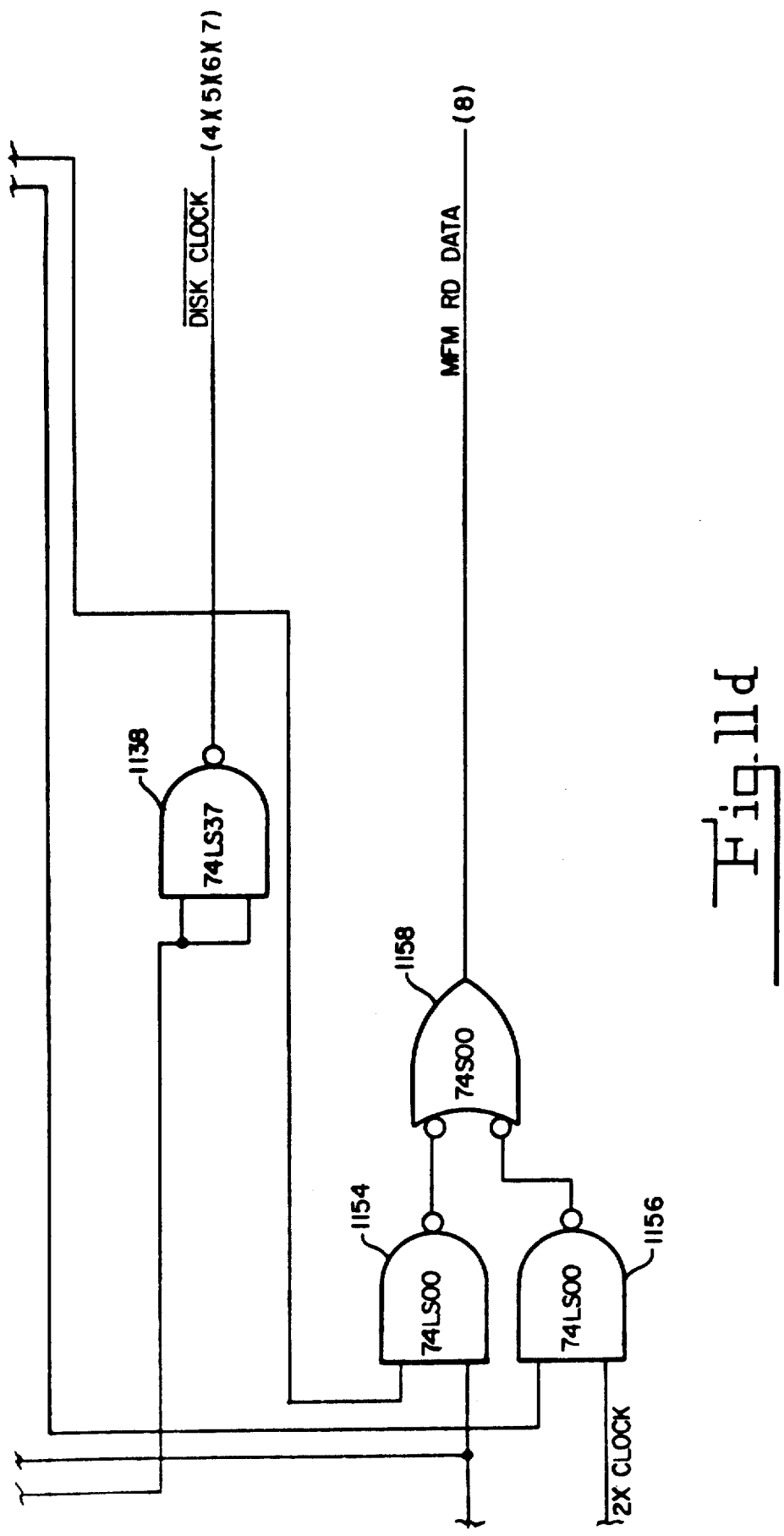
Figure 12A:
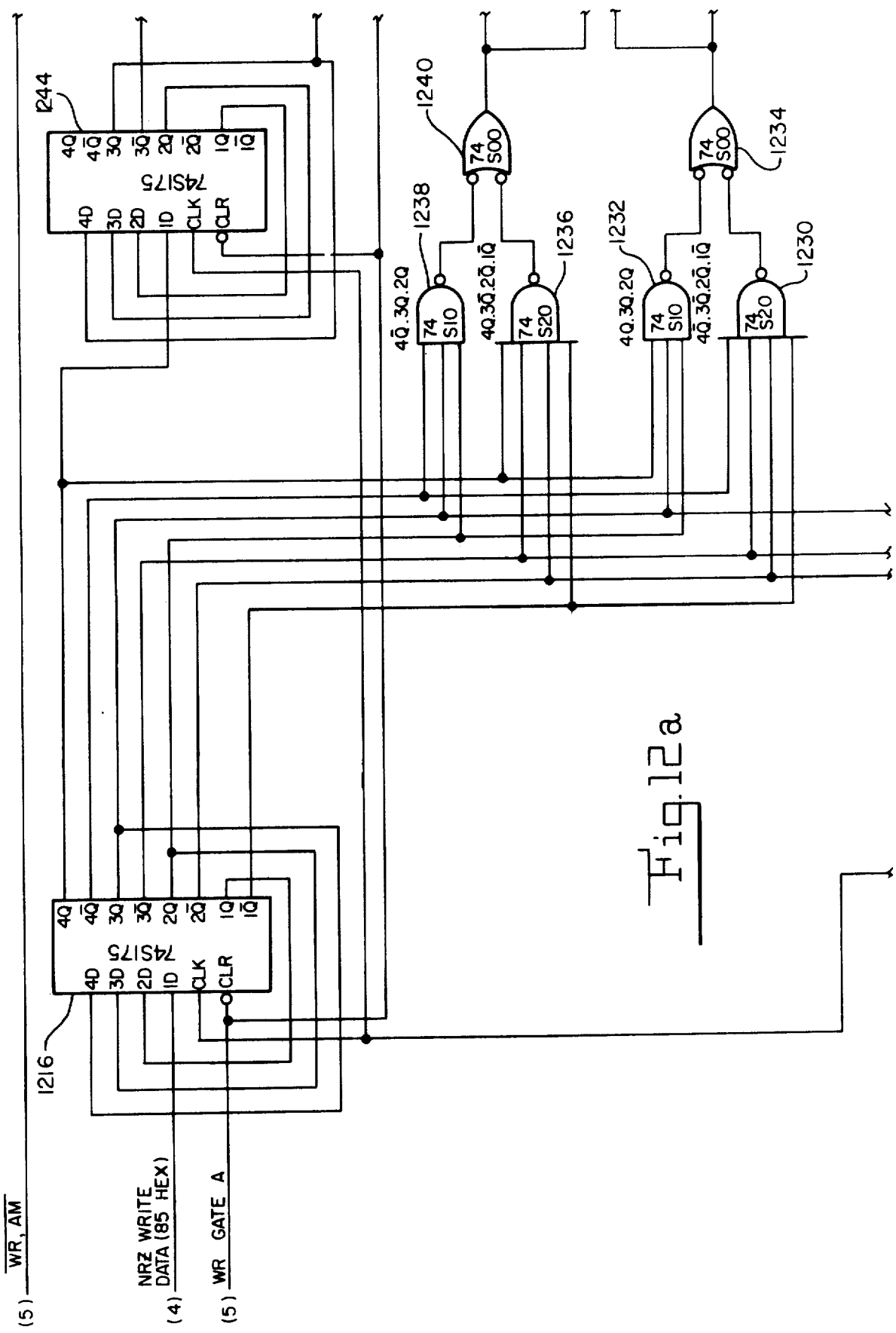
Figure 12C:
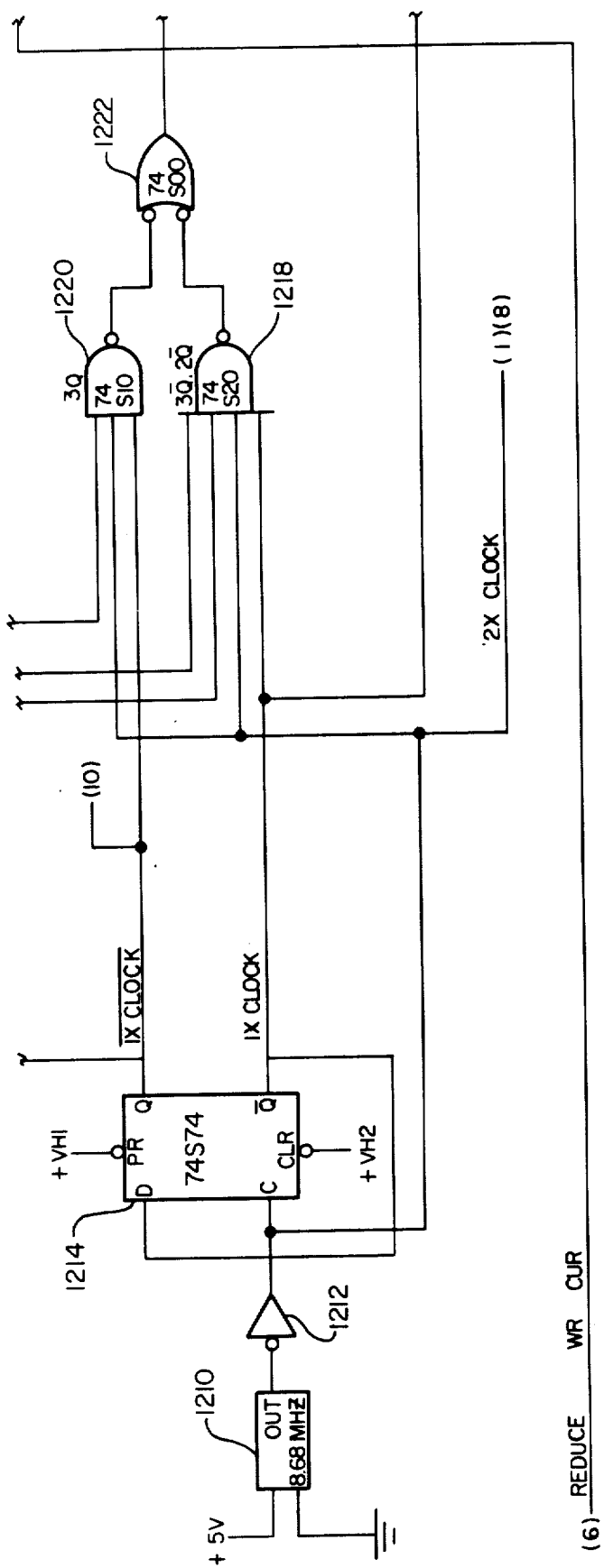
Figure 12F:
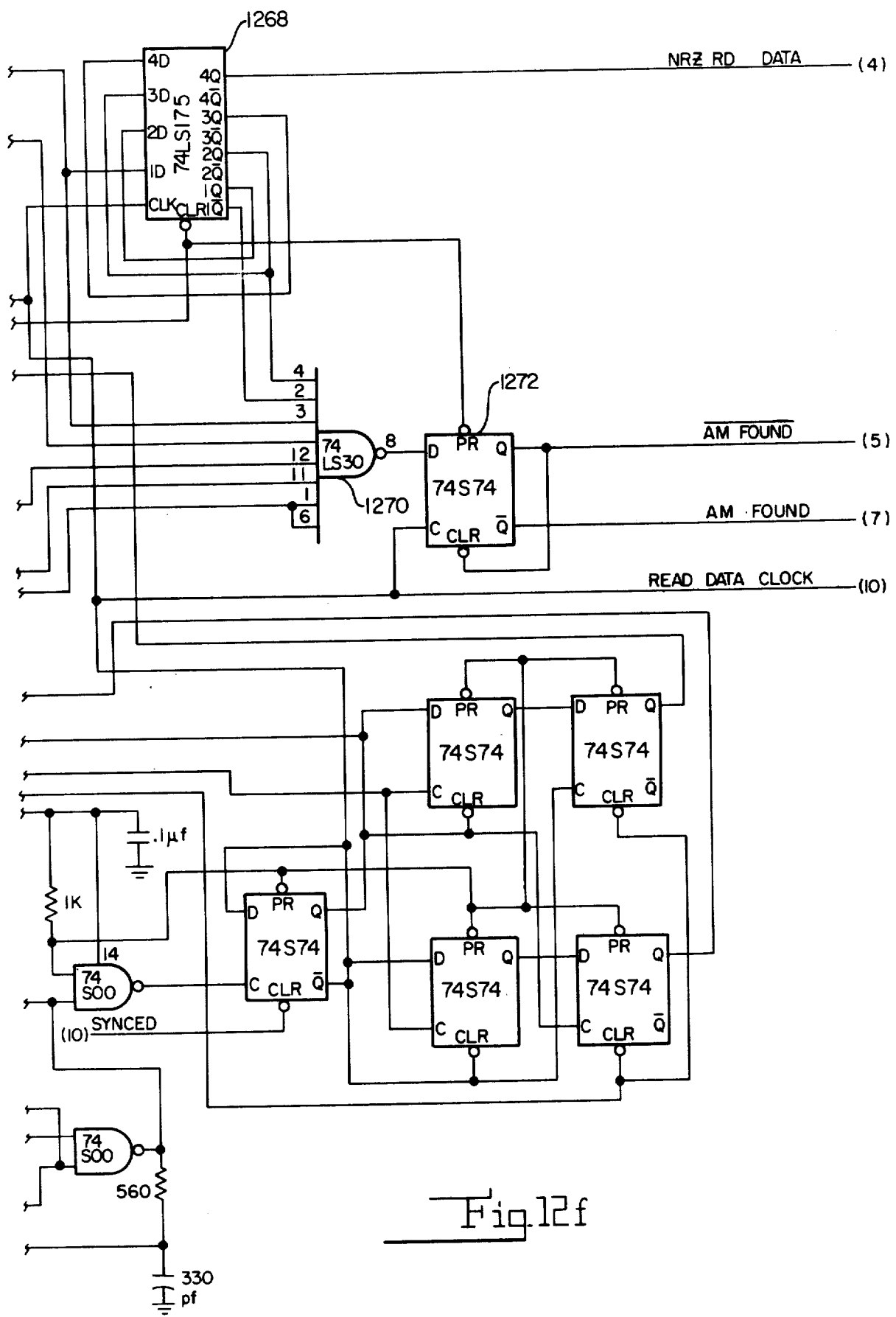

Referring now also to FIG. 5, there is shown a flow chart of the operations of the data path sequencer. FIG. 5a is a flow chart of a disk write/DMA read operation for the data path sequencer. The flow chart is contained in the code which is stored in PROMs 412 and 414 (FIG. 4).

In operation, the disk controller microprocessor 410 initializes a sequencer read operation. A sequencer read instruction addresses the PROMs 412 and 414 from address 0 to 15. The program flow begins with a start operation, step 510. The first instruction encountered is a no op instruction, step 512. At address 2, the sequencer checks its input status condition to determine whether the operation is a drive command, step 514. If it is not a drive command, the sequencer generates a DMA request, step 516, advancing the address to 5.

Another condition is checked, step 518, to determine whether operation is DMA data ready. If so, the sequencer indicates that a byte of data has been presented by the floppy disk processor 116 to the rigid disk controller 118. Data is available for the sequencer. If no DMA data ready occurs, the sequencer stays in its tightly controlled loop, waiting for the floppy disk processor 116, to present a byte on the bus. If 500 milliseconds have elapsed, step 519, however, program execution terminates, step 521.

Once the floppy disk microprocessor 210 or 116 has presented the byte, the sequencer advances to the next address, step 520, where it activates an ENABLE DMA DATA line. This in turn gates a data byte onto the disk controller microprocessor bus, which is the first data byte to be stored in the sequencer RAM data buffer 260 by the data path sequencer. Once it has stored this data byte, the sequencer branches back to step 514, where it begins the check for a drive command again. It stays in this loop until 256 bytes of data (one data block) have been accummulated.

If the command is a drive command, step 514, the sequencer loads the serializer data register, step 522. The first byte of data is loaded into the buffer 260, which resides in front of the serializer 248, for transfer to the disk. Once step 522 has been performed, the sequencer advances to another conditional block, step 524, to determine whether DMA DONE has occurred. DMA DONE indicates to the sequencer that the floppy disk processor 116 has transferred all data bytes. If the floppy disk processor 116 has transferred all data bytes required for this operation, the sequencer determines whether a serializer request has been presented by the hardware format sequencer, step 526. If a serializer request is pending, the sequencer loads the serializer data register, step 522. But if a serializer request is not pending, the sequencer determines whether the present command, disk write/ DMA read, has terminated, step 527. If at step 527 command DMA DONE occurs, the sequencer terminates the operation and disconnects from the channel, step 529.

If DMA DONE is not active, step 527, a branch is once again made to step 524, where DMA DONE is checked. If DMA has not occurred, the sequencer checks the status of buffer space available, step 528. If buffer space is available, the sequencer checks serializer request, step 526; if a serializer request is pending, step 526, the sequencer loads the next data byte into the buffer residing in front of the serializer/deserializer 248 for serialization by the hardware format sequencer, step 522.

If all the data bytes required for this operation have not been transferred, the sequencer forces a branch from step 524 to step 528, to check the status of buffer space available. If buffer space is still available, the sequencer branches to step 526 again to determine whether a serializer request is pending. If buffer space is not available, however, the sequencer generates a DMA request to fetch the next data byte, step 530. The sequencer advances from step 530 to step 532, where it checks DMA READY to determine whether the floppy disk processor 116 has presented the next data byte on the bus. If the next data byte has not been presented, the sequencer checks buffer available status again, step 528. If no buffer space is still available, the sequencer then attempts to load the first 256-byte data block into the sequencer RAM data buffer 260 before it initiates transfer to the disk. The sequencer ramains in this loop until the floppy disk processor 116 has presented a data byte or until 500 milliseconds have elapsed, at which point the operation aborts.

If at step 532 DMA data is ready, the sequencer enables the data onto the rigid disk controller data bus for storage in the buffer, step 534.

Referring now to FIG. 5b, there is shown a flow chart of disk read/DMA write operations, illustrating the sequencer operation which transfers data from a disk drive 120 (FIG. 1) into the memory of the floppy disk processor 116. The operation is initiated by the rigid disk controller microprocessor 210 (FIG. 3), which places the sequencer at start, step 540. At address 1, the sequencer executes a no op instruction, step 542. It advances to step 544 to check for a drive command. That is, the sequencer determines whether the command involves the disk drive 120 as well as the floppy disk microprocessor DMA channel.

If the command is not a drive command, the sequencer checks the DMA channel ready status to determine whether the DMA channel is available for the transfer of data, step 546. If it is not, the sequencer remains in an execution programming loop, step 546, until such time as the DMA channel becomes ready or, after 500 milliseconds have elapsed, step 547, the command aborts, step 549. If this time interval has not yet elapsed, step 547, a branch is made again to check the DMA channel availability, step 546.

If the DMA channel is ready, step 546, the sequencer writes the sequencer DMA data, step 548. A byte of data is transferred to the floppy disk processor DMA channel. The next DMA data request is made, step 550, and drive command status is checked, step 544. This operation, assuming that the command is not a drive command, continues until 256 bytes of data have been transferred to the floppy disk microprocessor memory.

If the operation is a drive command, step 544, a branch is made to step 552 to determine whether deserializer (DSR) data is available. If deserializer data is available, the sequencer activates the DSR DATA line, step 554. This allows the sequencer to store the byte of data from the deserializer into the sequencer RAM data buffer.

The sequencer checks DMA channel ready to determine whether the floppy disk microprocessor DMA channel is available for data transfer, step 556. If the DMA channel is not ready, the sequencer again determines whether deserializer data is available, step 552, and continues program execution from that point.

If the DMA channel is available, however, the sequencer advances to step 558, where it writes sequencer DMA data. A byte of data is transferred from the buffer to the floppy disk processor DMA channel. The sequencer then sets a DMA request, step 560, requesting the floppy disk microprocessor 210 for another DMA cycle.

At this point the sequencer advances to step 552 where it once again checks the availability of deserializer data. If deserializer data is available, it repeats the aforementioned programming loop consisting of steps 554, 556, 558 and 560 until 256 bytes of data have been transferred. If the sequencer determines that deserializer data is not available, step 552, however, program execution branches to step 562, where the sequencer determines whether the command has been performed. If the command has not been performed, the sequencer again checks the availability of the DMA data channel, step 556. If the command has been performed, step 562, however, the sequencer terminates the disk read/DMA write operation, step 564.

Hardware Format Sequencer

Figure 6:
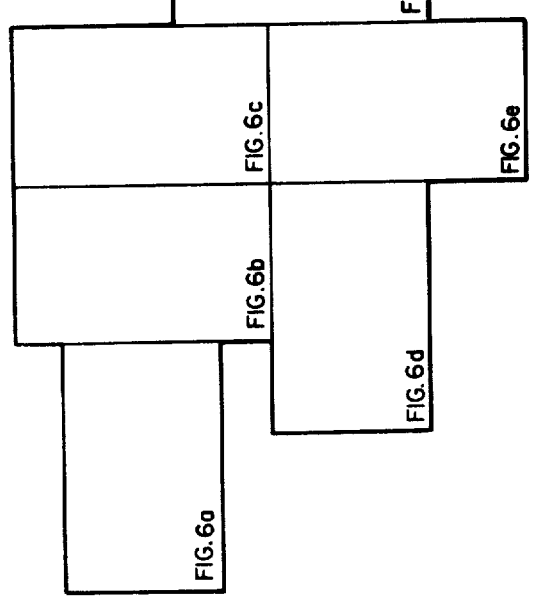
FIG. 6 is an interconnection diagram of FIGS. 6a through 6f which, taken together, are a schematic diagram of the hardware format sequencer of the present invention.

Referring now also to FIG. 6, there is shown a schematic diagram of the rigid disk controller hardware format sequencer Gate 610 has three command signals applied to it: READ bar, WRITE CMD bar and FORMAT bar. These signals are loaded by the rigid disk controller microprocessor 234 when a command to a disk is generated and are applied to a data input (D) of the sector coincidence (SC) flip flop 616. The clock input (C) for the SC flip flop 616 is applied through a gate 612 with two inputs. One input is an INDEX bar signal from the disk drive 120; the second input is a write sequence (WR SEQ) bar signal, which is generated by the rigid disk microprocessor 234. The SC flip flop 616 has a reset (CLR) signal generated through a gate 614, which gate 614 is activated by two signals: END CMD bar and ON CYL.

The Q-output of the SC flip flop 616 is applied to a gate 618, the second input of which is a signal labelled ERR bar, which indicates to the hardware format sequencer that an error has occurred during the present operation.

The preset (PR) port of the SC flip flop 616 has a jumper 617 connected to it for performing a manufacturing test. It is possible to test the hardware format sequencer in the absence of a disk and/or command operation.

Device 620 is a two-input gate. One input is a SYNC bar signal, which indicates when a SYNC byte has been detected by the deserializer logic. The second input is an address mark found (AM FOUND) bar signal generated by the data separator 276 when an address mark from the disk drive 120 has been detected.

The output of gate 620 is presented to the address mark (AM) SYNC flip flop 622 as a data input. The clock input (C) to the AM SYNC flip flop 622 is a disk clock (DISK CLK) bar signal, which is a multiplexed clock. During a disk write operation, DISK CLK is the output of a crystal oscillator operating at a frequency of 4.34 megahertz. During a disk read operation, DISK CLK is generated from the read data.

The output of the AM SYNC flip flop 622 is presented to gate 624, the second input to which is derived from the output of gate 618. The output of gate 624 is applied to a SYNC flip flop 626, on its preset (PR) input. The clock input to the SYNC flip flop 626 is a read gate (RD GATE) signal, which is generated by the hardware format sequencer.

The output of SYNC flip flop 626 is presented to a three-input gate 628, the second input to which is derived from an inverter 637. The third input is presented by a gate 618. The output of gate 628 is applied to the load input of a bit counter 638.

The bit counter 638 counts eight cycles of the disk clock to indicate to the hardware format sequencer when an 8-bit byte of data has been transferred to, or received from, the disk drive. The bit counter 638 works in conjunction with a byte counter 630. Once the bit counter 638 counts eight clock pulses, it advances device 636 by one, indicating that a byte has been accumulated. At a byte count of 16, the bit counter 638 causes device 634 to advance a count. Device 634 of the byte counter 630 counts device 636 by 16, which in turn causes an advance of device 632 of the byte counter 630.

The byte counter 630 and the bit counter 638 form the A input to sequencer comparators 640 and 642. The second input to the sequencer comparators 640 and 642 is generated by sequencer ROMs MS (most significant) 644 and LS (least significant) 646.

The least significant four bits of the sequencer ROM LS 646 is presented to the control register 650. The four most significant bits form the lower four bits of the B input of the sequencer comparator 642 to be compared with the bit counter QC input and the three lower order bits of device 636. The lower order two bits of the control register 650 are applied to a read ROM 660 and to a write ROM 662. These two least significant bits are labelled B0 and B1.

The control register 652 inputs are presented by the most significant six bits of the read ROM 660 and the write ROM 662. One input to the read ROM 660 is a signal labelled READ, which is loaded into the command register 648 by the rigid disk controller microprocessor 234. This READ signal enables the read ROM 660. The most significant address bit A4 of the read ROM 660 is a signal labelled WR CHECK ECC, which is generated and loaded by the rigid disk controller microprocessor 234 for a WR CHECK ECC command.

The write ROM 662 is selected by a signal labelled WRITE, which the rigid disk controller microprocessor 410 generates. The most significant address bit A4 of the write ROM 662 is a signal labelled FORMAT, which is generated by the rigid disk controller microprocessor 234.

The sequencer comparator output 640 and 642 is presented to a gate 654 labelled COMPARE (CMP). This CMP gate 654 detects the output of the sequencer ROM 644 and 646 with the output of the byte counter 630 and the bit counter 638. On comparison it presents an active signal to the address advance (ADD ADV) flip flop 656. The output of ADD ADV flip flop 656 is presented as the clock (C) input to the address counter (ADD CTR) ROM 658. The four outputs of the address counter ROM 658 are presented to the least significant addresses of the sequencer ROMs 644 and 646 and the read and write ROMs 660 and 662 to address those devices.

The outputs of the controller register 648 are presented to the rigid disk controller 118 as various command and function lines. Output 1Q of device 650 is a signal labelled RD GATE. It is sent to a specified disk drive 120 where it activates the read circuitry of the drive. It is also presented to SYNC flip flop 626 and to several other places in the logic, including gates 668 and 666. RD GATE is ANDed with RD ID from device 650 to form a signal labelled ID FIELD. The ID FIELD signal informs the rigid disk controller 118 that the ID field is being read from the disk drive 120 for comparison.

The 3Q output of device 650 is presented to a gate 664, the second input to which is the signal labelled FORMAT, which is generated by the rigid disk controller microprocessor 234 during a format operation.

The output of sequencer ROM LS 646 is a signal labelled write address mark (WRITE AM) bar. This informs the write encoder circuit of the rigid disk controller 118 that an address mark is being presented to it during a format operation.

Output 4Q of device 650 is a signal labelled enable (EN) ECC CLOCK. This signal is sent to the ECC generator 252 and to check logic for the generation and/or detection of ECC bytes.

Output 5Q of device 650 is a signal labelled RD ECC FIELD. This signal informs the rigid disk controller 118 that the ECC field is being presented by the disk drive 120 for check purposes.

The 6Q output of device 652 is a signal labelled RD DATA FIELD. This signal indicates to the rigid disk controller 118 that the data field of the selected sector is being presented by the drive 120.

Output 5Q of device 652 is a signal labelled END FULL SECTOR. This signal informs the rigid disk controller 118 that the entire sector has been transferred by the disk drive 120 and that the operation should terminate.

Output 4Q of device 652 is presented as one input of gate 676, the second input to which is the signal labelled RD ID, which is generated by the rigid disk controller 118 when the command is a read ID command.

The output of gate 676 is a signal labelled ID END. This signal indicates to the rigid disk controller 118 that a read ID command has terminated or should be terminated.

Output 3Q of device 652 is presented as one input to gate 672, the second input to which is a signal labelled WR CHECK ECC bar. This signal is generated by the rigid disk controller microprocessor 234 when a write check ECC command is to be executed.

In the absence of write check ECC command, the output of gate 672 is a signal labelled WR ECC FIELD. This signal indicates to the rigid disk controller 118 tha the ECC field should be written on the disk drive 120. The output of gate 672 is applied to an inverter 678, which generates a WR ECC FIELD bar signal.

Output 2Q of device 652 is presented to the D input of a write (WR) DATA flip flop 670. The clock input (C) to the WR DATA flip flop 670 is generated by an inverter 677, via a BIT 8 bar signal. The output of WR DATA flip flop 670 is a signal labelled WR DATA FIELD, which indicates to the rigid disk controller 118 that the data field portion of the sector is to be written on the disk.

The 1Q output of device 652 is a signal labelled WR GATE. This signal is presented to the disk drive write circuitry to indicate that data is to be written onto the disk. It is also presented to an inverter 674, the output of which is a WR GATE A bar signal, which is applied to another inverter 680, the output of which is a WR GATE A signal.

Sequencer Operation

The sector byte counter 630 and 638 contains the byte and bit that the rigid disk controller 118 is processing. A DISK CLK bar signal is derived from a 4.34 MHz clock to maintain a synchronous relationship between the sector byte counter 630 and 638 and the data being read or written onto the disk.

The sequencer comparator 640 and 642 compares the output of the sector byte counter 630 and 638 with the sequencer ROMs 644 and 646 to identify the byte for which a new control function is needed. When a compare occurs, the ROM address 648 is incremented to point to the next sequence and control functions. The new control functions are then loaded into the control register 648 from the read ROM 660 or from the write ROM 662.

Figure 10:
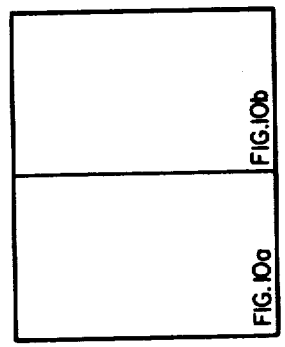
FIG. 10 is an interconnection diagram of FIGS. 10a and 10b which, taken together, are a chart of a disk format sequencer code in accordance with the present invention.

Referring now also to FIG. 10, the WRITE CHECK ECC bit indicates that a read operation should occur from the read ROM 660 addressed from 16 through 31 and from the sequencer ROMs 644 and 646 addressed from 16 through 31. The READ COMMAND bit indicates that a read operation should occur from the read ROM 660 addressed from 00 through 15 and from the sequencer ROMs 644 and 646 addressed from 00 through 15. The WRITE COMMAND bit indicates that a write operation should occur to the write ROM 662 addressed from 00 through 15 and to the sequencer ROMs 644 and 646 addressed from 15 through 31. The FORMAT COMMAND bit indicates that a write operation should occur to the write ROM 662 addressed from 15 through 31 and to the sequencer ROMs 644 and 646 addressed from 15 through 31.

Read Command Sequence

Figures 7A, 8A, 9A:
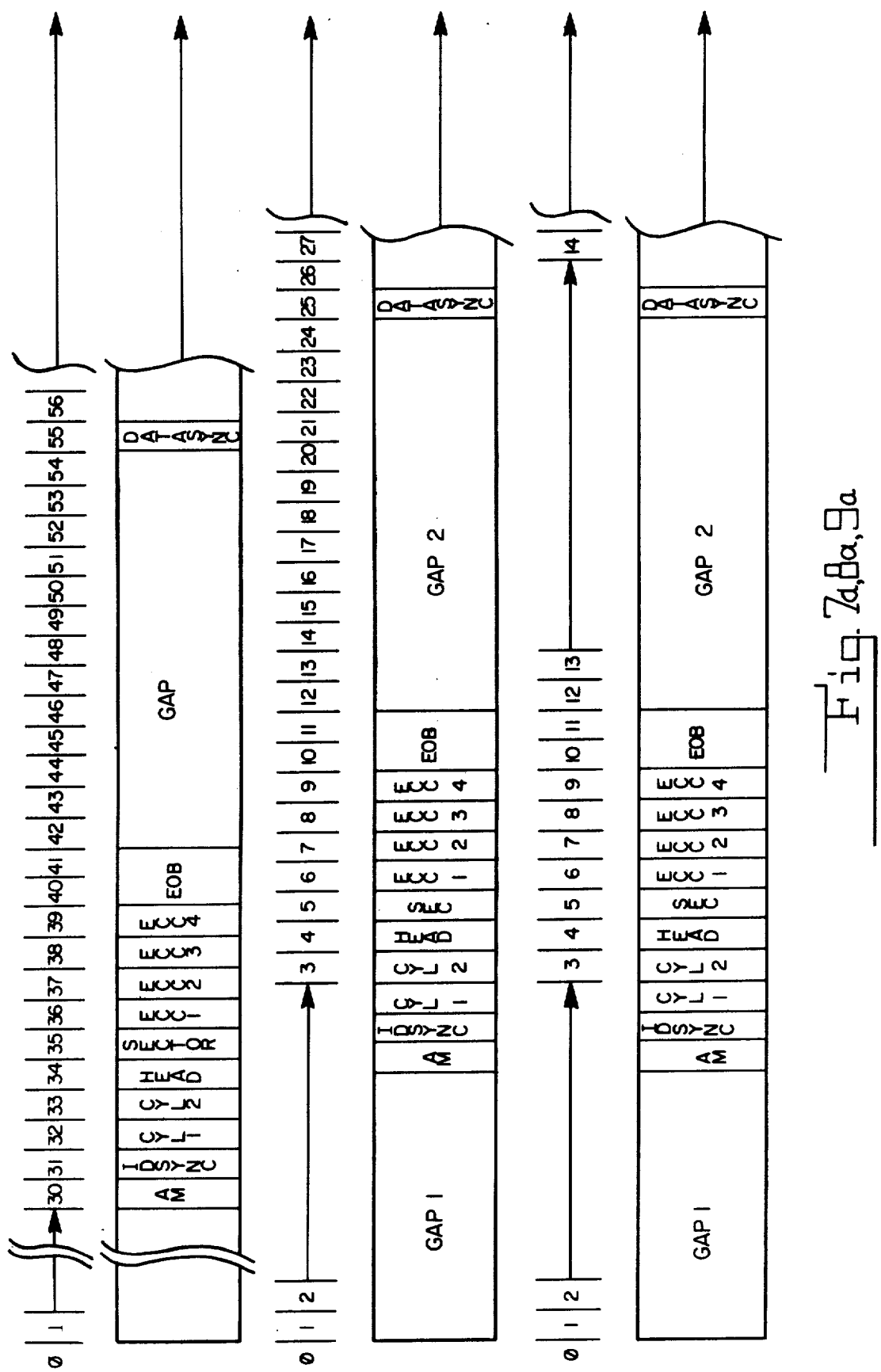
FIGS. 7, 8 and 9 are interconnection diagrams of FIGS. 7a and 7b, 8a and 8b, 9a and 9b respectively which, taken together, are a representation of the disk sequencer write header format (FIGS. 7a and 7b), the disk sequencer write command and write check ECC control functions (FIGS. 8a and 8b), and the disk sequencer read command control functions (FIGS. 9a and 9b) of the present invention.
Figures 7B, 8B, 9B:
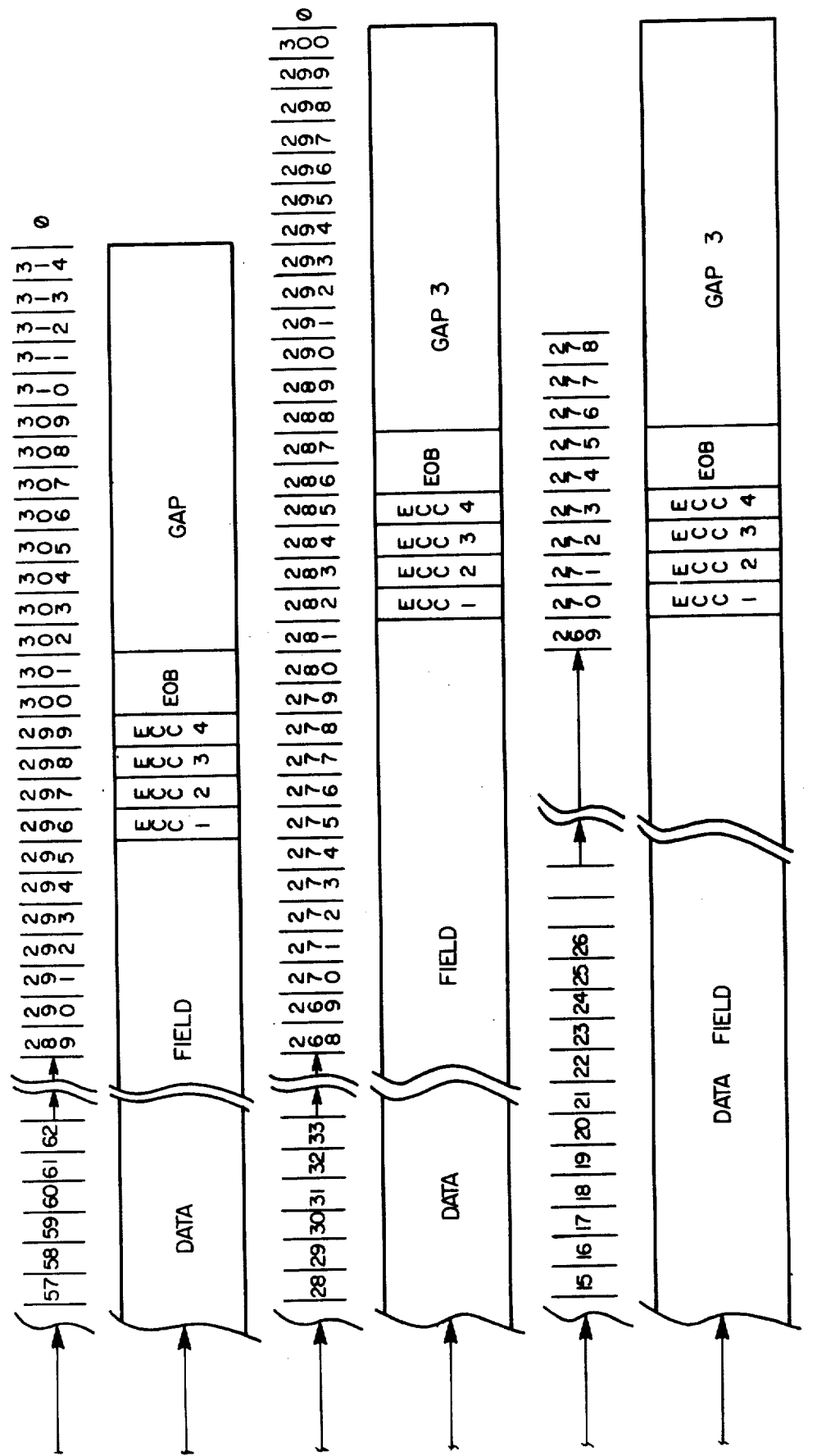

FIGS. 9 and 10, in conjunction with FIG. 6, can be used to describe the control signals for a read command. For a read command, the READ ROM bar signal is true, selecting the read ROM 660. The WRITE CHECK ECC signal is false and the read ROM is addressed from 00 to 15. A WRITE CMD signal is also false. Sequencer ROM most significant (MS) bit and sequencer ROM least significant (LS) bit are also addressed from 00 to 15. The sector coincidence (SC) flip flop 616 is reset until INDEX bar or WR SEQ bar is active. The SC flip flop 616 holds the sector byte counter 630 and 638 to address 00, sets the AM SYNC flip flop 622, and resets the ADD ADV flip flop 656, the address counter ROM 658 and the control register 648.

ROM address 0 sets sequencer byte 2 and no control functions. After the SC flip flop 616 sets the CLEAR input to all four counters of the sector byte counter 630 and 638, the sector byte counter 630 and 638 advances to byte 2 , bit 0 of the format. If the output of the sector byte counter 630 and 638 and the sequencer ROM agree, CMP is set. The next DISK CLK bar signal sets the ADD ADV flip flop 656 to advance the ROM address to 1. The sequencer ROMs 644 and 646 set byte 3, bit 4 of the format.

For purposes of this description, the sequence count is hereinbelow represented in this form:

[byte number].[bit number].

The next compare occurs at 3.4 (byte 3, bit 4 of the format). Sequencer ROM LS 646 contains four control functions: RD ID, RD ECC FIELD, EN ECC CLOCK and WR AM. The read ROM 660 sets RD GATE. The next DISK CLK bar signal resets the ADD ADV flip flop 656 since the new sequence does not agree with 2.0. The sequence comparator compares the byte count and bit 4 of the bit counter 638. The sector byte counter 630, advancing to 2.1, does not reset CMP. The sequencer ROMs 644 and 646, set to 3.4, reset CMP. The ADD ADV flip flop 656, resetting, loads the control register 648, setting RD GATE, RD ID and EN ECC CLOCK at a sequence count of 2.2.

The RD GATE signal is applied to the data separator 276 where it enables the read data circuitry thereof. RD GATE also resets the AM SYNC flip flop 622. The SYNC signal becoming false resets the bit counter 638 to zero on the next DISK CLK bar signal low-to-high transition. The sequence byte counter 630 is set back to 2.0. The RD GATE signal also allows the AM SYNC flip flop 622 to reset when a SYNC byte is detected by a data shift register 626 if an address mark has been detected.

The rigid disk controller 118 begins searching for the ID SYNC byte 20.3 microseconds after setting RD GATE. SYNC becoming false triggers a one-shot for 25 microseconds. If SYNC bar is false after 25 microseconds, this indicates that the rigid disk controller 118 did not find the SYNC byte for this sector. An ERR bar signal goes true, aborting the search on this sector. ERR bar going true resets the sequencer ROMs 644 and 646, control register 648, and AM SYNC flip flop 622. When ERR bar goes false, the sequencer begins again from ROM address 0 as hereinabove described. If, however, three index (INDEX bar) pulses are detected, the rigid disk controller 118 does not set ERR bar, but aborts the command, for it is unable to locate the desired sector in three revolutions of the specified disk.

When the SYNC byte is in the data shift register 626, the SYNC bar signal becomes true. The next DISK CLK bar signal resets the AM SYNC flip flop 622, allowing the sector byte counter 630 and 638 to resume counting. When the sector byte counter 630 and 638 reaches 2.8, the first ID byte is in the data shift register 626. The control function RD ID enables an ID check NAND gate 666 to generate a low-going pulse when BIT 8 and the DISK CLOCK bar signals are true. The following edge of ID CHECK pulse is used to check the ID byte and advance the ID selector address.

When the sector byte counter 630 and 638 contains 3.4, CMP is set; the ROM address 658 advances to 2. A new sequence count of 6.4 is set. The control register 648 is reloaded with the same control functions, RD GATE, RD ID and EN ECC CLOCK. At a sequence count of 3.8, the second byte of the ID field is checked.

At the sequence count of 6.4, another compare occurs. The ROM address advances to 3. The new sequence count is set to 9.4. The control register 648 sets RD GATE, reloads EN ECC CLOCK and resets the RD ID signal.

At the sequence count of 9.4, another compare occurs. The ROM address advances to 4. The new sequence count is set to 10.4. The control register 648 sets RD GATE, EN ECC CLOCK, and RD ECC FIELD.

At the sequence count of 9.8, RD ECC FIELD enables the ID check NAND gate 666. ID CHECK is used to check if ID FIELD was read correctly.

At the sequence count of 10.4 another compare occurs. The ROM address advances to 5 and the new sequence count is set to 11.4. The control register 648 resets RD GATE, RD ECC FIELD and reloads EN ECC CLOCK.

At the sequence count of 11.4, the ROM address advances to 6. A new sequence count of 13.0 is set. ID END is set and no other control function is loaded. If the command is a READ ID command, the rigid disk controller 118 sets an ending status and terminates the command.

At the sequence count of 13.0, the ROM address advances to 7. A new sequence count of 13.4 is set. The control register 648 sets RD GATE and reloads EN ECC CLOCK. RD GATE becoming set resets the AM SYNC flip flop 622. The sector byte counter 630 and 638 remains at 13.0 until the DATA FIELD SYNC byte is located. Setting the AM SYNC flip flop 622 is the same process that occurs when the rigid disk controller 118 searches for the ID FIELD sync byte. After finding the sync byte, the sector byte counter 630 and 638 resumes counting.

At count 13.4 the sequencer reloads RD GATE, and EN ECC CLOCK and sets RD DATA FIELD. The data field is now processed. The RD DATA FIELD signal enables a data clock NAND gate to set DSR AVAIL to the data path sequencer when the BIT 8 and DISK CLOCK bar signals are true for the next 256 bytes.

At count 269.4, the sequencer reloads RD GATE, EN ECC CLOCK and resets RD DATA FIELD.

At count 273.4, the sequencer reloads RD GATE and EN ECC CLOCK.

At count 274.0, the sequencer reloads RD GATE, sets RD ECC FIELD and resets EN ECC CLOCK. A new sequence count of 274.4 is set.

At count 274.8 the data field ECC is checked. A new sequence count of 275.0 is set.

At count 275.8 the sequencer resets the RD GATE signal. A new sequence count of 276.0 is set.

At the sector byte count of 276.0 the sequencer sets an EOFS (End of Full Sector) signal which resets the SC flip flop 616 and the command register and sets a COMMAND DONE signal.

Write Command Sequence

FIGS. 8 and 10, in conjunction with FIG. 6, can be used to describe the control signals for a write command. For a write command operation, the WRITE bar signal is true, selecting the write ROM 662. The FORMAT signal is false and the write ROM 662 is addressed from 00 to 15. The WRITE CMD signal is true, selecting the sequencer ROM MS 644 and LS 646. The sequencer ROM 644 and 646 are addressed from 16 to 31.

The sequence for a write command is the same as for a read command until after the ID fields are read and checked.

At count 10.8, the sequencer resets RD ECC FIELD and sets the write address mark (WR AM) signal.

At count 12.0, the sequencer resets WR AM. WR GATE is applied to the specified disk drive 120, where it activates the write amplifier and allows current to flow to the selected read/write head. The WR GATE signal resets the EN FILE flip flop. The EN FILE flip flop disables the EN DATA RD bar signal and enables the two tri-state drivers. All SER signals are high except SER0 and SER4. EN FILE bar being false generates an LD DATA signal. LD DATA places the data shift register 626 in the parallel load mode. A DISK CLOCK bar signal loads DSR0 with SER0 until the EN FILE flip flop is set. The rigid disk controller 118 begins writing zeros on the specified disk.

At count 24.0, the sequencer sets WR GATE, reloads EN ECC CLOCK, and sets WR DATA FIELD. WR DATA FIELD becoming true causes the clear input to the EN FILE flip flop to become inactive. WR DATA FIELD also enables a load data NAND gate. When the sector byte counter 630 and 638 reaches 24.1, the EN FILE flip flop sets. EN FILE flip flop setting causes PARALLEL LOAD to become false. The data shift register 626 shifts the eight bits of the sync word.

When the sector byte counter 630 and 638 reaches 24.8, the LOAD DATA flip flop anticipates the next positive going edge of the DISK CLOCK bar signal. The LOAD DATA signal generates two signals: PARALLEL LOAD and LOAD DATA. The next negative transition of DISK CLOCK bar loads the data shift register 626 from the data buffer latch. The next positive transition of DISK CLOCK bar resets the LOAD DATA flip flop since the BIT 8 signal is false, resetting LOAD DATA and PARALLEL LOAD. LOAD DATA becoming false allows the rigid disk controller 118 to begin shifting out the first data byte to the specified disk. This process is repeated for 256 bytes.

At count 280.4, the sequencer sets WR ECC FIELD and reloads WR GATE and WR DATA FIELD.

At count 281.4, after the last data word is loaded into the data shift register 626, the sequencer resets WR DATA FIELD and reloads WR ECC FIELD. WR DATA FIELD becoming false disables the load data NAND gate.

When the sector byte counter 630 and 638 reaches 281.8, BIT 8 going false sets the WR ECC flip flop 672. WR ECC becoming true disables DSR0 from setting the NRZ WRITE DATA flip flop. A low on the WR ECC signal also changes the functions of the ECC generator 252. The DISK CLOCK bar signal shifts the 32 bits of ECC instead of entering data bits. WR ECC allows PAT0 to set the NRZ WRITE DATA flip flop.

At count 285.4, the sequencer resets WR ECC FIELD and reloads WR GATE. WR ECC becoming false resets the EN FILE flip flop, forcing DSR0 false.

When the sector byte counter 630 and 638 reaches 285.8, BIT 8 resets the WR ECC flip flop 672. The rigid disk controller 118 has written the data ECC field and continues to write zeros on the disk.

At count 288.0, the sequencer resets WR GATE. The rigid disk controller 118 has written three bytes of zeros onto the disk.

At count 289.0, the sequencer sets EOFS, terminating the read sector command.

Format Write Header Command

The format write header command is used to write the header field gap, sector address mark sync byte, and ID fields on the specified disk drive. It does not write the data field or data field sync byte.

FIGS. 7 and 10 describe the control signals for a format write header command. The write ROM 662 is addressed from address 10 to 1F hex and the sequencer ROMs 644 and 646 are also addressed from 16 to 31.

The SC flip flop 616 is reset until the INDEX bar signal is active. The SC flip flop reset holds the sector byte counter 630 and 638 to address 10. RD GATE is inactive for the entire format write header command, thus holding the AM SYNC flip flop 622 and the SYNC flip flop 626 set.

When the INDEX bar signal is made active the reset is lifted from the bit and byte counters, 632, 634, 636 and 638.

ROM address 0 sets sequence byte 2 and WR GATE. WR GATE is applied to the specified disk drive 120 where it activates the write data circuitry of the drive 120. The rigid disk controller 118 starts writing zeros to the drive 120 through the MFM generator logic 275. The ROM address 658 advances to 16.

At the sector byte count of 2.0, a compare occurs. The ROM address 658 advances to 17. The control register 648 reloads WR GATE and sets EN ECC CLOCK and RD ID. A new sequence count of 3.4 is set.

At the sector byte count of 3.4, another compare occurs. A new sequence count of 6.4 is set. The ROM address 658 advances to 18. The control register 648 reloads WR GATE, EN ECC CLOCK and RD ID.

At the sector byte count of 6.4, a compare occurs. A new sequence count of 9.4 is set. The ROM address 658 advances to 19. The control register 648 resets RD ID and reloads WR GATE and EN ECC CLOCK.

At the sector byte count of 9.4, a compare occurs. A new sequence count of 10.4 is set. The ROM address 658 advances to 20. The control register 648 reloads WR GATE and EN ECC CLOCK.

At the sector byte count of 10.4, a compare occurs. A new sequence count of 11.0 is set. The ROM address 658 advances to 21. The control register 648 reloads WR GATE and EN ECC CLOCK.

At the sector byte count of 11.0, a compare occurs. A new sequence count of 12.0 is set. The ROM address 658 advances to 22. The control register 648 reloads WR GATE and EN ECC CLOCK and sets WR AM.

At the sector byte count of 12.0, another compare occurs. A new sequence count of 24.0 is set. The ROM address 658 advances to 23. The control register 648 reloads WR GATE, EN ECC CLOCK and WR AM.

At the sector byte count of 24.0, a compare occurs. A new sequence count of 43.4 is set. The ROM address 658 advances to 24. The control register 648 reloads WR GATE and EN ECC CLOCK, resets WR AM and sets WR DATA FIELD.

At the sector byte count of 43.4, a compare occurs. A new sequence count of 280.4 is set. The ROM address 658 advances to 25. The control register 648 resets WR GATE and WR DATA FIELD and reloads EN ECC CLOCK.

At the sector byte counts of 280.4, 281.4, 285.4 and 287.4, compares occur. The ROM address 658 advances by one for each sector byte count and the control register 648 reloads EN ECC CLOCK.

At the sector byte count of 288.4, another compare occurs. The ROM address 658 advances to 30. A new sequence count of 299.0 is set. The control register 648 reloads EN ECC CLOCK.

At the sector byte count of 299.0, the final compare occurs. The ROM address 658 advances to 31. A new sequence count of 00 is set. The control register 648 loads EOFS, which terminates the format write header command.

Write Check ECC Command

The write check ECC command is a diagnostic command used by the floppy disk processor 116 to verify the operation of the ECC logic of the rigid disk controller 118.

The command is identical to a write data command with the following exceptions: (1) the ECC field for this command is supplied to the rigid disk controller 118 by the floppy disk processor 116 and allows the floppy disk processor 116 to create an error during a write check ECC command to determine whether the rigid disk controller 118 can detect it upon execution of a read data command for this data block; (2) the sequencer ROMs 644 and 646 are addressed from 16–31; (3) the read ROM 660 is addressed from 16–31; (4) the ECC generator logic 252 does not generate data field ECC bytes.

FIGS. 8 and 10 describe the control signals for a write check ECC command.

As hereinabove stated, the write check ECC command is identical to a write data command until the ECC field is to be written. This occurs at ROM 658 address 26 and sequence count 281.4.

At the sector byte count of 281.4, a compare occurs. The ROM address 658 advances to 27, the sequence count is set to 285.4. The control register 648 reloads WR GATE, EN ECC CLOCK and WR DATA FIELD. WR DATA FIELD is extended an additional four bytes, the length of the ECC field.

At the sector byte count of 285.4, a compare occurs. The ROM address 658 advances to 28. A new sequence count of 287.4 is set. The control register 648 reloads WR GATE, and EN ECC CLOCK and resets WR DATA FIELD.

At the sector byte count of 287.4, another compare occurs. The ROM address 658 advances to 29. A new sequence count of 288.0 is set. The control register 648 reloads WR GATE and EN ECC CLOCK.

At the sector byte count of 288.4, a compare occurs. The ROM address 658 advances to 30. The sequence count is set to 299.0. The control register 648 resets WR GATE and EN ECC CLOCK.

At the sector byte count of 299.0, the final compare occurs. The ROM address 658 advances to 31. The sequence count is set to 00. The control register 648 loads EOFS which terminates the command.

Referring still to FIGS. 7, 8 and 9, each block of data that includes the 256 bytes of data to be written to the specified disk (i.e., the data field) also includes a number of bytes collectively referred to as a data identification field. This field defines the location on the disk of the data to be written thereon or read therefrom. This data identification field includes identification parameters in the form of markers or bytes of data labelled address mark (AM), IDSYNC, cylinder one (CYL1), CYL2, HEAD and SECTOR.

Immediately following the data identification field are four bytes of ECC information labelled ECC1 through ECC4. These ECC bytes are referred to as a header identification verifier, and are used to verify the accuracy of their respective data identification field.

A DATA SYNC byte or marker is then provided to indicate the start of a 256- byte data field, which contains the data to be stored on or retrieved from the disk. Immediately following the data field are four additional bytes of ECC information labelled ECC1–ECC4, referred to as a data field verifier, and used to verify the accuracy of data in the data field.

When a disk is first formatted for use with a hard disk drive in the word processing system, a data identification field and its corresponding header identification verifier is generated and written onto each track on the disk. Moreover, a field of zeroes is then written on the disk, covering the area that eventually may contain a data field.

During the second portion of the format operation, the rigid disk controller reads each data identification field and corresponding header identification verifier to verify that no errors occurred in the format write operation. Defective disk tracks can thus be detected. Optionally, the data fields for each track can be filled with a certain character (e.g., zero or 6C hex) and a data field verifier corresponding to the data field can be generated and written onto each disk track.

In a write operation to the disk, the rigid disk controller first determines the position on the disk to which a block of data is to be written. The stored data identification field is located on the disk. If the header identification verifier indicates an error in its corresponding data identification field, the rigid disk controller attempts to verify by reading from the disk two more times. If still unsuccessful, the rigid disk controller dos not use the defective disk location to store data. Such an operation is commonly referred to as sparing the disk track.

When no defect is detected on the disk, the rigid disk controller generates a DATA SYNC byte and then transfers the data block to be written onto the disk, followed by the corresponding data field verifier. Zeroes or other characters which were originally stored on the disk during the formatting operation are overwritten with the information in the data field and data field verifier.

In a read operation from the disk, the rigid disk controller reads the specified data identification field and associated header identification verifier to check the accuracy of the former field. The data field as well as its corresponding data field verifier are then read from the disk. If an error in the data field is detected, the rigid disk controller attempts to correct it. However, if the error cannot be located (i.e., a non-correctable error occurs), the rigid disk controller attempts to read the same data field two more times before terminating operation.

If, however, no error is detected or detected errors are corrected, the data field may be transferred from the disk to the system for further processing.

Figure 11:
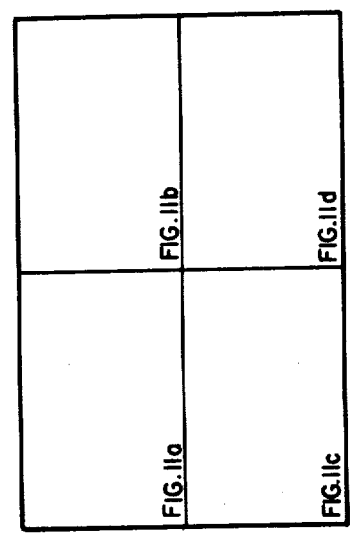
FIG. 11 is an interconnection diagram of FIGS. 11a through 11d which, taken together, are a schematic diagram of the data separator start logic and disk clock with MFM read data of the present invention.

Referring now to FIG. 11, a schematic diagram of the data separator start logic and disk clock with MFM read data is shown. A Model No. 74S74 D-latch 1110 is connected to two one-shots 1112 and 1116. The outputs of both of these one-shots 1112 and 1116 are applied to a three-input AND gate 1120. The output from the AND gate 1120 is applied to a two-input NOR gate 1122, the other input to which NOR gate 1122 is a signal generated by an inverter 1124.

The output of the NOR gate 1122 is applied to a D-latch 1126. The output from the Q bar port of the D-latch 1126 is applied to a four-bit up/down counter 1126. The up/down counter 1128 is connected to a D-latch 1130. This latch 1130 supplies two signals: SYNCED and SYNCED bar.

The SYNCED signal is coupled to a READ DATA CLOCK signal through device 1132 and the SYNCED bar signal is coupled to a 1X CLOCK bar signal through device 1134. Devices 1132, 1134 and 1136 form a two-to-one multiplexer. The output of this multiplexer is a DISK CLK bar signal which is applied to a two-input NAND gate 1138. The output of this NAND gate 1138 is a DISK CLOCK bar signal.

Signals entitled + and − MFM READ DATA 0, MFM READ DATA 1, MFM READ DATA 3 and MFM READ DATA 2 are all generated by the fixed disk drive 120. The signals labelled SELECTED 1, SELECTED 2, SELECTED 3 and SELECTED 4 indicate which of the four drives (disk drive zero through three, respectively) is to be accessed. The RD GATE A signal is obtained from the hardware format sequencer to indicate that a read operation is occurring.

These signals are applied to differential line receivers 1140 and 1146. The differential line receiver 1140 consists of gates 1142 and 1144; and the dual differential line receiver 1146 consists of gates 1148 and 1150. The outputs from both dual differential line receivers 1140 and 1146 are applied to a four-input NAND gate 1152. The output from the NAND gate 1152 is applied to a two input NAND gate 1154 as well as to the D-latches 1110 and 1126, and to the up/down counter 1128. The other input of the NAND gate 1154 is the SYNCED signal. NAND gate 1156 receives input from a 2X CLOCK signal and the SYNCED bar signal. The output from both NAND gates 1154 and 1156 is applied to a NAND gate 1158, the output of which NAND gate 1158 is a MFM RD DATA signal.

In operation, the 1110 D-latch clock input is the output of the NAND gate 1152. This is the raw MFM data coming from the selected disk drive 120. The D input of the latch 1110 is connected to its Q bar output. This configuration, with READ GATE A active, causes the latch 1110 to toggle, that is, change conditions on each input at its clock. The Q output of the latch 1110 is applied to the one-shot 1112. The timing on the one-shot 1112 is set to 330 nanoseconds. The Q bar output of the latch 1110 is applied as an input to the second one-shot 1116 whose timing is also set to 330 nanoseconds.

The Q bar output of the two one-shots 1112 and 1116 forms two inputs to the three-input NAND gate 1120. The third input to NAND gate 1120 is supplied by the Q bar output of latch 1130, labelled SYNCED bar. The SYNCED bar signal is inactive or in a high condition until 32 bits of zeros have been detected by this logic.

If at any time the Q bar outputs of one-shots 1112 and 1116 are active and the SYNCED signal is inactive, this indicates that the disk is not in an all zero data field. If this condition occurs, the output of the three-input AND gate 1120 is applied to a two-input NOR gate 1122 whose output presets the D-latch 1126. The setting of latch 1126 causes its Q bar output to force the four-bit up/down counter 1128 to reset. The reset is accomplished by bringing the input labelled LD of the counter 1128 low. When this condition occurs, the data separator start logic restarts and begins searching again for a data field of all zeros.

The data separator start logic is unable to detect a data field of all zeros or a data field of all ones. If it is in a data field of all ones, it attempts to synchronize. This is accomplished by the Q bar output of latch 1130 setting the signal SYNCED. The SYNCED signal is applied as one input to a two-input NAND gate 1154. It is also applied as one input to a data multiplexer 1132. The second input to the multiplexer 1132 is a READ DATA CLOCK signal. This signal is derived from the data stream by the data separator. When the data separator is synchronized, the output of multiplexer 1136 is a DISK CLK bar signal. This signal, when inverted through a two-input NAND gate 1138, supplies a DISK CLOCK bar signal to the controller as a system clock.

At this time the controller operates in synchronism with the disk drive's data field. Prior to the latch 1130 detecting a field of all zeros, the SYNCED bar signal is high. It is applied as one input to the second half of the data multiplexer 1136. The second input is a signal labelled 1X CLOCK bar which is the 4.34 megahertz clock signal. Prior to the data separator becoming synchronized, this input is active at the multiplexer 1136. The system clock is supplied by the crystal oscillator for a write operation or for a non-disk operation. At all other times, the system clock is derived from the data stream coming from the disk drive.

The signals labelled +MFM READ DATA 0 through +MFM READ DATA 3 and −MFM READ DATA 0 through −MFM READ DATA 3 are supplied by the disk drives 120 in conjunction with the signals labelled SELECTED 1 through SELECTED 4. These signals indicate which one of the four disk drives 120 is selected by the hard disk controller 118.

These signals form the inputs to the dual differential line receivers 1140 and 1146. The outputs of these receivers 1140 and 1146 are applied to a four-input NAND gate 1152. The output of gate 1152 is raw MFM data. It is applied as the C input to latch 1110. This is the actual data stream being read from the disk. It is also applied to gate 1154 in conjunction with the Q output of latch 1130, the SYNCED signal, which is active when the data separator has locked to the data stream.

The output of gate 1154 is applied to a two-input NAND gate 1158. The output of gate 1158 is MGM RD DATA, which is applied to the data separator. The second input of gate 1158 is supplied by a two input NAND gate 1156, one of whose inputs is the SYNCED bar signal. This signal is high prior to the data separator locking to the data field. This indicates that a field of zeros has not been detected or that the operation is a write disk operation. The second input to gate 1156 is a 2X CLOCK (8.68 megahertz) signal. This signal is applied through gate 1158 as MFM RD DATA to the data separator which allows the data separator to stay in synchronism when a read operation is not being performed by the disk.

Figure 12:
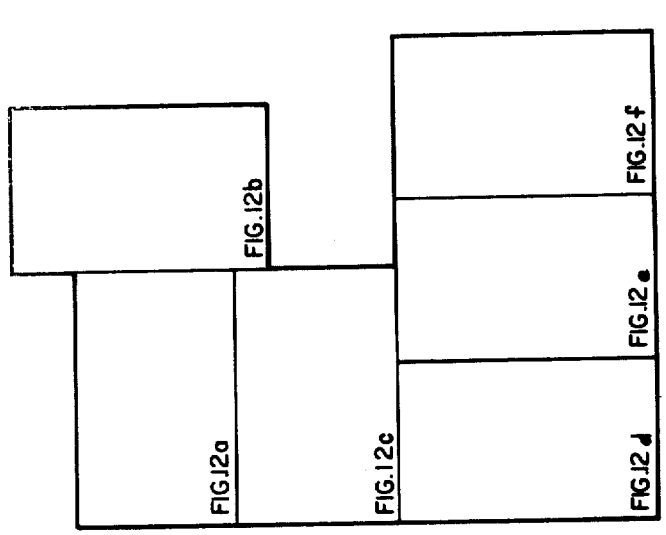
FIG. 12 is an interconnection diagram of FIGS. 12a through 12f which, taken together, are a schematic diagram of the MFM data encoder and the data separator in accordance with the present invention.

Referring now to FIG. 12, there is shown a schematic diagram of the MFM data encoder and the data separator. A crystal oscillator operating at 8.68 megahertz is provided at reference numeral 1210. The output signal is applied through an inverter 1212 to a Model No. 74S74 D-latch 1214. The Q bar output of the D-latch 1214 is applied to a Model No. 74LS193 up/down counter 1215, which counter 1215 supplies a WORD CLOCK signal.

A WR GATE A signal is generated by the hardware format sequencer when a write operation occurs. This WR GATE A signal is applied to a four-bit D-latch 1216. Also applied to the latch 1216 is an NRZ WR DATA signal, which is generated by the serializer/-deserializer 248 (FIG. 3).

Two outputs from the D-latch 1216 are applied to a four-input NAND gate 1218. The other two inputs to this NAND gate 1218 are signals labelled 1X CLOCK and 2X CLOCK.

Another output from the D-latch 1216 is applied to a three-input NAND gate 1120. The other two inputs to this NAND gate 1220 are a 1X CLOCK bar signal and a 2X CLOCK signal. The outputs from both NAND gates 1218 and 1220 are applied to a two-input NOR gate 1222, the output from which NOR gate 1222 is applied to an AND gate 1224. The output of the AND gate 1224 is applied to a delay line 1226 which generates a signal through an inverter 1228 via its output port 16. The output of inverter 1228 is applied to the other input of AND gate 1224.

The D-latch 1216 supplies four inputs to a four-input NAND gate 1230. The D-latch 1216 also supplies three signals as the inputs to a three-input NAND gate 1232. The outputs from both NAND gates 1230 and 1232 are applied to a NOR gate 1234. Similarly, outputs from the D-latch 1216 are applied to the four-input NAND gate 1236 and to a three-input NAND gate 1238. The outputs from both of these NAND gates 1236 and 1238 are input to a NOR gate 1240. NOR gates 1234 and 1240 supply the inputs to a two-input AND gate 1242.

The D-latch 1216 is connected to another D-latch 1244. The 3Q bar output of D-latch 1244 is applied to the C input of a Model No. 74S74 D-latch 1246. Connected to the D-latch 1246 is a NAND gate 1248. Devices 1246 and 1248 function as a clock bit inhibit device. The other output of NAND gate 1248 is supplied from the D-latch 1244. The output from the NAND gate 1248 is applied to NAND gates 1250 and 1256. The other inputs of NAND gate 1250 are the output of AND gate 1242, a REDUCE WR CUR signal, and the nominal (N) output of delay line 1226.

NAND gate 1252 has three inputs: the output of NOR gate 1240, the REDUCE WR CUR signal, and the late (L) output signal of delay line 1226.

NAND gate 1254 has three inputs: the output of NOR gate 1234, the REDUCE WR CUR signal, and the early (E) signal from the delay line 1226.

NAND gate 1256 has three inputs: the output of NAND gate 1248, the nominal (N) output line of delay line 1226, and the REDUCE WR CUR bar signal from inverter 1257.

The output from the four NAND gates 1250, 1252, 1254 and 1256 are input to a four-input NOR gate 1258. The gate 1258 generates a WR DATA signal, which is supplied to differential drivers, not shown.

An address mark detector circuit is shown generally at reference numeral 1260. Two signals, ERR bar and RD GATE A, are input to a NOR gate 1262. The RD GATE A signal is obtained from the hardware format sequencer and the ERR bar signal is obtained from the error detector logic circuitry. The output from NOR gate 1262 is applied to three four-input latches 1264, 1266 and 1268. Some of the outputs of these three gates 1264, 1266 and 1268 are NANDed through NAND gate 1270, which has eight inputs.

The output of NAND gate 1270 is applied to a D-latch 1272. Also applied to the D-latch 1272 is a clock signal from the data separator, as hereinbelow described and a preset signal generated by the NOR gate 1262. The output of the D-latch 1262 are two signals: address marker found (AM FOUND) and AM FOUND bar. These signals are applied to the hardware format sequencer, and the AM FOUND signal is applied to the error detection circuit.

Data separator circuitry is shown generally at reference numeral 1274. The data separator 1274 is available from the Western Digital Corporation of Irvine, Calif. A complete description of this circuit can be found in Publication SPEC. Number 80-031001-10, entitled "WD 1000 Winchester Disk Controller OEM Manual".

The 8.68 MHz operating frequency of the oscillator 1210 is two times the nominal frequency at which disk drives operate. The output of the oscillator 1210 is applied to an inverter 1212 whose outputs is the clock input to a D-latch 1214. This D-latch 1214 divides the 8.68 megahertz signal by two to form a 4.34 megahertz signal for the clocking of data and system controls.

The Q bar output of latch 1214 is supplied to a four-bit up/down counter 1215 which is used to divide the oscillator frequency by eight, forming the WORD CLOCK signal which is applied to the disk drive. The signal is used b the disk drive for internal controls.

The MFM data encoder 1216 through 1258 is necessary for disk drive operation. Once the drive head passes the halfway point of the specified disk, it becomes necessary to reduce the write current. This is accomplished by a technique referred to as write pre-compensation. During write pre-compensation, the hardware supplying the data and clock pulses to the disk drive determines whether a pulse is to be written in a particular bit cell and, in other cases if a pulse is to be written relatively early, nominally (i.e., on time) or late. The purpose of the MFM write encoder 1216 through 1258 is to make that determination. This is accomplished by gating selected outputs from the four-bit D-latch 1216 and gating the resultant signals through the series of NAND gates 1230, 1232, 1236 and 1238.

NAND gates 1218 and 1220 form the clock and/or data pulse that is to be written on the disk. Gate 1220 takes the 3Q port data output of latch 1216. (In MFM encode, the data bit is written from the fourth bit position).

Gate 1218 is used to encode a clock bit for the write operation to the disk. This is accomplished by monitoring the 3Q bar and 2Q bar ports of latch 1216. During write precompensation, gates 1218 and 1220 are always active and supply a data pulse via gates 1222 and 1224 to the delay line 1226. The output of the delay line 1226 is used during write pre-compensation only. A four-bit latch 1244 receives its 1D input from the 4Q output port of latch 1216 to form the clock (C) input to a D-latch 1246. The combination of latches 1244 and 1246 is used to generate a unique data pattern for address mark detection.

Because MFM data is merely a stream of clock and the absence of clock signals, it is necessary that the pattern which defines the beginning of a sector be unique. Latches 1244 and 1246 inhibit or eliminate a clock bit when commanded by the hardware format sequencer activating the WR AM bar signal. When a data pattern of 85 hex is loaded and the WR AM bar signal is inactive, the next clock bit is deleted from the data stream.

The output of the MFM encoder 1258 is a WR DATA signal. There are always clock pulses and/or data pulses present on this signal line. Gates 1250, 1252, 1254 and 1256 form the four inputs to gate 1258. Gates 1240, 1242 and 1234 determine which inputs to gate 1258 is to be applied. The delay line 1226 makes the determination as to whether the selected input to gate 1258 is to be written early, nominally or late. Inverter 1257 receives its input from the REDUCE WR CUR signal, supplied by a cylinder address register of the controller not shown. This cylinder address register determines whether the data supplied to gate 1258 is to be write pre-compensated.

The address mark detector circuit 1260 is used to detect the unique address mark, i.e., the missing clock bit, that was written to the disk. It receives the input data pattern, shifts it through three D-latches attempting to detect a missing clock bit. This missing clock bit is detected by an eight-input NAND gate 1270. The output of gate 1270 supplies the D input to a D-latch 1272. The clock input for latch 1272 is the RD DATA CLOCK signal which is supplied by the data separator 1274. When the latch 1272 resets, the signals AM FOUND bar and AM FOUND are active and are applied to the hardware format sequencer to indicate that an address mark has been detected. The AM FOUND signal ia supplied to the error detection logic to indicate the absence of an address mark.

The data separator 1274 is supplied with two signals, one of which is a SYNCED signal derived from the data separator start logic. This signal is generated when 32 bits of zeros have been detected. The second input to the data separator 1274 is a RD MFM DATA signal. This signal is generated by the disk clock and MFM read data circuitry. This is gated from the disk drive 120 when the start logic is in synchronism or is supplied by the crystal oscillator when the start logic is not in synchronism with the data field.

The present invention is particularly directed to use in a word processing system which will employ varying features and functions, described in differing aspects, in any one or more of the following groups of copending patent applications of the present applicant, including this one, all filed concurrently: ART-118 for "FIXED DISK CONTROLLER FOR USE IN A WORD PROCESSING SYSTEM"; ART-124 for "METHOD FOR DETECTING AND CORRECTING ERRORS IN DATA TRANSFERS IN A HARD DISK CONTROLLER"; ART-125 for "HIGH SPEED DATA PATH SEQUENCER FOR USE IN A HARD DISK CONTROLLER"; and ART-126 for "BUFFER FOR USE WITH A FIXED DISK CONTROLLER".

Inasmuch as certain changes may be made in the above described invention without departing from the spirit and scope of the same, it is intended that all matter contained in the above description or shown in the accompanying drawings shall be interpreted in an illustrative rather than limiting sense. Moreover, it is intended that the following claims be interpreted to cover all the generic and specific features of the invention herein described.

What is claimed is:

1. A controller for transferring data to a disk drive comprising:
    (a) interfacing means for receiving information to be transferred to a disk drive;
    (b) processing means operatively connected to said interfacing means for controlling the transfer of said information to said disk drive; and
    (c) temporary memory storage means operatively connected to said processing means.

2. The controller in accordance with claim 1 wherein said temporary memory storage means has a plurality of partitions, each of which partitions is capable of temporarily storing a block of data.

3. The controller in accordance with claim 2 wherein said temporary memory storage means has a first partition for receiving information from said interfacing means and a second partition for transferring information to said disk drive whereby the receiving of information by said first partition and the transferring of information by said second partition can occur concurrently.

4. The controller in accordance with claim 3 wherein upon completion of said receiving operation of said first partition and said transferring operation of said second partition, said partitions are capable of reversing functions such that said second partition can receive information from said interfacing means and said first partition can transfer information to said disk drive concurrently.

5. The controller in accordance with claim 4 further comprising serializing/deserializing means operatively connected between said temporary memory storage means and said disk drive for formatting the information from the information transferring partition of said temporary memory storage means to a form suitable for use by said disk drive.

6. The controller in accordance with claim 4 wherein said temporary memory storage means is a random access memory (RAM) buffer.

7. The controller in accordance with claim 4 wherein said disk drive is adapted for accessing data on a fixed disk.

8. The controller in accordance with claim 7 wherein said disk drive is a Winchester disk drive.

9. The controller in accordance with claim 4 wherein said interfacing means is a floppy disk processor interface.

10. The controller in accordance with claim 4 wherein the temporary memory storage means is capable of operating on a first-in/first-out basis such that the information earliest received by said temporary memory storage means is the information first transferred to said disk drive.

11. A controller for transferring data to a disk drive comprising:
    (a) interfacing means for receiving information to be transferred to a disk drive;
    (b) processing means operatively connected to said interfacing means for controlling the transfer of said information to said disk drive;
    (c) temporary memory storage means operatively connected to said processing means adapted to implement instructions therefrom; and
    (d) means operatively connected to said temporary memory storage means for performing direct memory access (DMA) operations between said interfacing means and said disk drive.

12. The controller in accordance with claim 11 wherein said temporary memory storage means has a plurality of partitions, each of which partitions is capable of temporarily storing a block of data.

13. The controller in accordance with claim 12 wherein said temporary memory storage means has a first partition for receiving information from said interfacing means and a second partition for transferring information to said disk drive whereby the receiving of information by said first partition and the transferring of information by said second partition can occur concurrently.

14. The controller in accordance with claim 13 wherein upon completion of said receiving operation of said first partition and said transferring operation of said second partition, said partitions are capable of reversing functions such that said second partition can receive information from said interfacing means and said first partition can transfer information to said disk drive concurrently.

15. The controller in accordance with claim 14 further comprising serializing/deserializing means operatively connected between said temporary memory storage means and said disk drive for formatting the information from the information transferring partition of said temporary memory storage means to a form suitable for use by said disk drive.

16. The controller in accordance with claim 14 wherein said temporary memory storage means is a random access memory (RAM) buffer.

17. The controller in accordance with claim 14 wherein said disk drive is adapted for accessing data on a fixed disk.

18. The controller in accordance with claim 17 wherein said disk drive is a Winchester disk drive.

19. The controller in accordance with claim 14 wherein said interfacing means is a floppy disk processor interface.

20. The controller in accordance with claim 14 wherein the temporary memory storage means is capable of operating on a first-in/first-out basis such that the information earliest received by said temporary memory storage means is the information first transferred to said disk drive.

21. A controller for transferring data from a disk drive comprising:
   (a) interfacing means for accepting information transferred from a disk drive;
   (b) processing means operatively connected to said interfacing means for controlling the transfer of said information from said disk drive; and
   (c) temporary memory storage means operatively connected to said processing means adapted to implement instructions therefrom.

22. The controller in accordance with claim 21 wherein said temporary memory storage means has a plurality of partitions, each of which partitions is capable of temporarily storing a block of data.

23. The controller in accordance with claim 22 wherein said temporary memory storage means has a first partition for receiving information from said disk drive and a second partition for transferring information to said interfacing means whereby the receiving of information by said first partition and the transferring of information by said second partition can occur concurrently.

24. The controller in accordance with claim 23 wherein upon completion of said receiving operation of said first partition and said transferring operation of said second partition, said partitions are capable of reversing functions such that said second partition can receive information from said disk drive and said first partition can transfer information to said interfacing means concurrently.

25. The controller in accordance with claim 24 further comprising serializing/deserializing means operatively connected between said temporary memory storage means and said disk drive for formatting the information from the disk drive to a form suitable for use by said interfacing means.

26. The controller in accordance with claim 24 wherein said temporary memory storage means is a random access memory (RAM) buffer.

27. The controller in accordance with claim 24 wherein said disk drive is adapted for accessing data on a fixed disk.

28. The controller in accordance with claim 27 wherein said disk drive is a Winchester disk drive.

29. The controller in accordance with claim 24 wherein said interfacing means is a floppy disk processor interface.

30. The controller in accordance with claim 24 wherein the temporary memory storage means is capable of operating on a first-in/first-out basis such that the information earliest received by said temporary memory storage means is the information first transferred to said disk drive.

31. A controller for transferring data from a disk drive comprising:
   (a) interfacing means for accepting information transferred from a disk drive;
   (b) processing means operatively connected to said interfacing means for controlling the transfer of said information from said disk drive;
   (c) temporary memory storage means operatively connected to said processing means adapted to implement instructions therefrom; and
   (d) means operatively connected to said temporary memory storage means for performing direct memory access (DMA) operations between said interfacing means and said disk drive.

32. The controller in accordance with claim 31 wherein said temporary memory storage means has a plurality of partitions, each of which partitions is capable of temporarily storing a block of data.

33. The controller in accordance with claim 32 wherein said temporary memory storage means has a first partition for receiving information from said disk drive and a second partition for transferring information to said interfacing means whereby the receiving of information by said first partition and the transferring of information by said second partition can occur concurrently.

34. The controller in accordance with claim 33 wherein upon completion of said receiving operation of said first partition and said transferring operation of said second partition, said partitions are capable of reversing functions such that said second partition can receive information from said disk drive and said first partition can transfer information to said interfacing means concurrently.

35. The controller in accordance with claim 34 further comprising serializing/deserializing means operatively connected between said temporary memory storage means and said disk drive for formatting the information from the disk drive to a form suitable for use by said interfacing means.

36. The controller in accordance with claim 34 wherein said temporary memory storage means is a random access memory (RAM) buffer.

37. The controller in accordance with claim 34 wherein said disk drive is adapted for accessing data on a fixed disk.

38. The controller in accordance with claim 37 wherein said disk drive is a Winchester disk drive.

39. The controller in accordance with claim 34 wherein said interfacing means is a floppy disk processor interface.

40. The controller in accordance with claim 34 wherein the temporary memory storage means is capable of operating on a first-in/first-out basis such that the information earliest received by said temporary memory storage means is the information first transferred to said disk drive.

41. A method for transferring information to a disk drive, the steps comprising:
   (a) storing a data block of information to be transferred in the first segment of an n-segment temporary memory storage device;
   (b) storing a data block of information to be transferred in each of at least a portion of the remaining (n−1) segments of the n-segment temporary memory storage device sequentially;
   (c) transferring the information stored in the first segment of the n-segment temporary memory storage device to the disk drive upon request of said disk drive;
   (d) transferring the information stored in each of at least a portion of the remaining (n−1) segments of the n-segment temporary memory storage device to the disk drive sequentially upon request of said disk drive; and (e) storing an $(n+1)^{th}$ data block of information to be transferred in said first segment of the n-segment temporary storage device after a data block of information has been stored in the $n^{th}$ segment of said n-segment temporary storage device, whereby the data block of information originally stored in said first segment of said n-segment temporary storage device is replaced by said $(n+1)^{th}$ data block of information.

42. The method for transferring information in accordance with claim 41 wherein steps (b) and (c) occur concurrently.

43. The method for transferring information in accordance with claim 41 wherein steps (d) and (e) occur concurrently.

44. The method for transferring information in accordance with claim 42 or 43 wherein said information is transferred to the disk drive on a first-in/first-out basis.

45. A method for transferring information from a disk drive to a receiving means, the steps comprising:

(a) storing a data block of information from the disk drive in the first segment of an n-segment temporary memory storage device;

(b) storing a data block of information from the disk drive in each of at least a portion of the remaining $(n-1)$ segments of said n-segment temporary memory storage device sequentially;

(c) transferring the information stored in the first segment of the n-segment temporary memory storage device to a receiving means upon request of said receiving means;

(d) transferring the information stored in each of at least a portion of the remaining $(n-1)$ segments of the n-segment temporary memory storage device to the receiving means sequentially upon request of said receiving means; and (e) storing an $(n+1)^{th}$ data block of information from the disk drive in said first segment of the n-segment temporary storage device after a data block of information has been stored in the $n^{th}$ segment of said n-segment temporary storage device, whereby the data block of information originally stored in said first segment of said n-segment temporary storage device is replaced by said $(n+1)^{th}$ data block of information.

46. The method for transferring information in accordance with claim 45 wherein steps (b) and (c) occur concurrently.

47. The method for transferring information in accordance with claim 45 wherein steps (d) and (e) occur concurrently.

48. The method for transferring information in accordance with claim 46 or 47 wherein said information is transferred to said receiving means on a first-in/first-out basis.

49. The method for transferring information in accordance with claim 45 or 46 or 47 wherein said receiving means is a floppy disk processor interface.

* * * * *